(12) United States Patent
Caron

(10) Patent No.: US 8,880,006 B2
(45) Date of Patent: Nov. 4, 2014

(54) RF SYSTEM HAVING INTERMODULATION SUPPRESSION BRANCHES

(75) Inventor: Joshua J. Caron, Madison, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 706 days.

(21) Appl. No.: 13/197,255

(22) Filed: Aug. 3, 2011

(65) Prior Publication Data
US 2012/0146699 A1 Jun. 14, 2012

Related U.S. Application Data

(60) Provisional application No. 61/421,416, filed on Dec. 9, 2010.

(51) Int. Cl.
H04B 1/44 (2006.01)
H04B 1/10 (2006.01)
H04B 1/48 (2006.01)

(52) U.S. Cl.
CPC . *H04B 1/48* (2013.01); *H04B 1/109* (2013.01)
USPC ............................................. 455/78; 455/73

(58) Field of Classification Search
CPC .................................. H04B 1/109; H04B 1/48
USPC ....................................... 455/73, 78; 327/231
See application file for complete search history.

(56) References Cited

U.S. PATENT DOCUMENTS

| | | | |
|---|---|---|---|
| 4,032,858 A * | 6/1977 | Hargis | 331/9 |
| 4,408,205 A * | 10/1983 | Hockham | 342/157 |
| 5,148,130 A * | 9/1992 | Dietrich | 333/25 |
| 6,392,779 B1 | 5/2002 | Iannelli et al. | |
| 6,496,064 B2 | 12/2002 | Rzyski | |
| 6,757,338 B1 * | 6/2004 | Kim et al. | 375/296 |
| 7,693,674 B2 | 4/2010 | Rzyski et al. | |
| 2002/0070803 A1 * | 6/2002 | Rzyski | 330/149 |
| 2007/0032976 A1 | 2/2007 | Rzyski et al. | |
| 2008/0037590 A1 * | 2/2008 | Aiga et al. | 370/497 |
| 2008/0197936 A1 | 8/2008 | Berg | |
| 2009/0015508 A1 | 1/2009 | Prikhodko et al. | |
| 2010/0049463 A1 | 2/2010 | Rzyski et al. | |
| 2012/0146742 A1 * | 6/2012 | Caron et al. | 333/132 |
| 2013/0169378 A1 | 7/2013 | Kim et al. | |

OTHER PUBLICATIONS

Final Office Action for U.S. Appl. No. 13/170,593, mailed Apr. 5, 2013, 8 pages.
Final Office Action for U.S. Appl. No. 13/170,593, mailed May 20, 2013, 6 pages.

(Continued)

*Primary Examiner* — Lewis West
(74) *Attorney, Agent, or Firm* — Withrow & Terranova, P.L.L.C.

(57) ABSTRACT

An RF system for suppressing third-order intermodulation (IM3) products is disclosed. The RF system is made up of a plurality of branches coupled in parallel. Each of the plurality of branches includes a positive phase shift network, a negative phase shift network, and nonlinear components, wherein the nonlinear components are coupled between the positive phase shift network and the negative phase shift network. The RF system also includes a null offset branch with nonlinear components that are coupled in parallel with the plurality of branches. In one embodiment, the nonlinear components are series stacked field effect transistors (FETs) that comprise an RF switch having a switch segment for the null offset branch and a switch segment for each of the plurality of branches. The RF switch further includes a control terminal for turning the FETs on and off.

33 Claims, 19 Drawing Sheets

(56) References Cited

OTHER PUBLICATIONS

Non-Final Office Action for U.S. Appl. No. 13/170,593, mailed Jul. 19, 2013, 6 pages.
Non-Final Office Action for U.S. Appl. No. 13/197,216, mailed Sep. 4, 2013, 6 pages.
Non-Final Office Action for U.S. Appl. No. 13/272,537, mailed Sep. 6, 2013, 6 pages.
Non-final Office Action for U.S. Appl. No. 13/170,593 mailed Dec. 13, 2012, 6 pages.
Notice of Allowance for U.S. Appl. No. 13/272,537, mailed Dec. 4, 2013, 7 pages.
Final Office Action for U.S. Appl. No. 13/170,593, mailed Dec. 16, 2013, 9 pages.
Notice of Allowance for U.S. Appl. No. 13/197,216, mailed Dec. 11, 2013, 9 pages.
Advisory Action for U.S. Appl. No. 13/170,593, mailed Mar. 20, 2014; 2 pages.

* cited by examiner

RF SYSTEM HAVING INTERMODULATION SUPPRESSION BRANCHES

RELATED APPLICATIONS

This application claims the benefit of provisional patent application Ser. No. 61/421,416, filed Dec. 9, 2010, the disclosure of which is hereby incorporated herein by reference in its entirety. This application is related to U.S. patent application Ser. No. 13/170,593 entitled RADIO FREQUENCY SWITCH FOR SUPPRESSING INTERMODULATION filed Jun. 28, 2011, the disclosure of which is incorporated herein by reference in its entirety. This application is also related to a concurrently filed utility application Ser. No. 13/197,216, filed Aug. 3, 2011, entitled DIPLEXED TX FILTER AND RF SWITCH WITH INTERMODULATION SUPPRESSION, now U.S. Pat. No. 8,736,398, the disclosure of which is incorporated herein by reference in its entirety.

FIELD OF THE DISCLOSURE

The present disclosure relates to suppressing intermodulation (IM) products generated by electronic devices used in wireless communication products such as mobile terminals.

BACKGROUND

It is well-known that mobile terminal operation can be degraded by the presence of a strong interfering signal. For example, a nearby mobile terminal or base station operating at a different frequency can produce strong interfering signals. Furthermore, communications industries and in particular the cellular communication industry desire an ability to transmit and receive signals in two separate bands at the same time within a single mobile terminal. However, implementing such a request practically guarantees strong signal interference within the single mobile terminal.

In the short term, a desire to talk and surf the web simultaneously on a single band is not possible due to shortcomings in the Evolution-Data Optimized (EVDO) standard. As a result of these shortcomings, a requirement has emerged for mobile terminals that can operate simultaneously on code division multiple access (CDMA) Band 5 for voice and long term evolution (LTE) Band 13 for data. This requirement is known as simultaneous voice/LTE (SV-LTE).

Unfortunately, due to the aforementioned interference problems, SV-LTE cannot be facilitated by simply operating two cellular front ends at the same time. For example, a major reason that a strong interferer signal degrades mobile terminal operation is a generation of third-order intermodulation (IM3) products in nonlinear electronic components such as RF switches that the signals encounter. This nonlinear phenomenon is a result of compression and/or clipping of the high-power signals as their levels exceed the linear dynamic range of the nonlinear electronic components. If a signal A is incident upon a nonlinear electronic component that compresses the signal A, a resulting signal $A_{compressed}$ can be modeled with an odd-order power series as follows in expression (1):

$$A \rightarrow A_{compressed} = \alpha_0 A - \alpha_1 A^3 + \alpha_2 A^5 - \alpha_3 A^7 + \ldots \quad (1)$$

If the compression is relatively light, the coefficients $\alpha_2$, $\alpha_3$, and higher are negligibly small, and the power series can be truncated after the cubic term $\alpha_1 A^3$. Therefore, the signal $A_{compressed}$ is approximated by expression (2).

$$A_{compressed} \approx \alpha_0 A - \alpha_1 A^3. \quad (2)$$

Now consider the signal A and another signal B that simultaneously engage an electronic component. If the electronic component is perfectly linear, a resultant signal is a superposition of the signal A and the signal B (i.e., A+B). However, practical electronic components suffer from various degrees of nonlinearity. Therefore, a cubic third-order term $\alpha_1(A+B)^3$ is included in expression (3) to more accurately model the resultant signal $(A+B)_{compressed}$.

$$(A+B) \rightarrow (A+B)_{compressed} \approx \alpha_0(A+B) - \alpha_1(A+B)^3. \quad (3)$$

Expanding the (A+B) of the cubic third order term $\alpha_1(A+B)^3$ into a full polynomial yields the expression (4).

$$(A+B)^3 = A^3 + 3A^2B + 3AB^2 + B^3 \quad (4)$$

If the signal A and the signal B are both sinusoidal the following expressions (5) and (6) are given.

$$A = a \cdot \sin(\omega_1 t + \phi_1) \quad (5)$$

$$B = b \cdot \sin(\omega_2 t + \phi_2), \quad (6)$$

The following trigonometric identities represented by expressions (7), (8) and (9) can be applied to expression (4).

$$\sin^3 x = \frac{1}{4}(3\sin x + \sin 3x) \quad (7)$$

$$\sin^2 x = \frac{1}{2}(1 - \cos 2x) \quad (8)$$

$$\sin x \cos y = \frac{1}{2}[\sin(x+y) + \sin(x-y)]. \quad (9)$$

Expanding out the third-order polynomial from expression (4) using the sinusoidal signals of expressions (5) and (6), it can be seen that the cubic third order term $\alpha_1(A+B)^3$ results in additional frequency content as shown below in expression (10).

$$[a \cdot \sin(\omega_1 + \phi_1) + b \cdot \sin(\omega_2 + \phi_2)]^3 = \quad (10)$$
$$(3/4a^3 + 3/2ab^2) \cdot \sin(\omega_1 t + \phi_1) +$$
$$(3/4b^3 + 3/2a^2b) \cdot \sin(\omega_2 t + \phi_2) - 1/4a^3 \sin(3\omega_1 t + 3\phi_1) -$$
$$1/4b^3 \sin(3\omega_2 t + 3\phi_2) - 3/2a^2b \sin([2\omega_1 + \omega_2]t + 2\phi_1 + \phi_2) -$$
$$3/2ab^2 \sin([\omega_1 + 2\omega_2]t + \phi_1 + 2\phi_2) +$$
$$3/2a^2b \sin([2\omega_1 - \omega_2]t + 2\phi_1 - \phi_2) +$$
$$3/2ab^2 \sin([-\omega_1 + 2\omega_2]t - \phi_1 + 2\phi_2).$$

In addition to the original frequencies, $\omega_1$ and $\omega_2$, the expression (10) demonstrates that compression results in new products at the $3^{rd}$ harmonic frequencies, $3\omega_1$ and $3\omega_2$, as well as four additional intermodulation frequencies, $2\omega_1 \pm \omega_2$ and $2\omega_2 \pm \omega_1$. These last four intermodulation frequencies are IM3 products, and two in particular, $2\omega_1 - \omega_2$ and $2\omega_2 - \omega_1$, tend to be problematic because they are relatively close in frequency to the original signals. As a result, the $2\omega_1 - \omega_2$ and $2\omega_2 - \omega_1$ IM3 products cannot be easily attenuated with a simple low-pass filter. Hereinafter, the IM3 product $2\omega_1 - \omega_2$ is designated as $IM3_{up}$ and the IM3 product $2\omega_2 - \omega_1$ is designated as $IM3_{down}$. The $IM3_{up}$ product has a frequency that is just above the transmit frequencies, while the $IM3_{down}$ product has a frequency that is just below the transmit frequencies. Furthermore, subsequent references herein to "IM3 products" will refer only to the $IM3_{up}$ product and the $IM3_{down}$ product, as the two additional IM3 products at $2\omega_1 + \omega_2$ and $2\omega_2 + \omega_1$ are not a particular concern of this disclosure.

FIG. 1 is a frequency spectrum for universal mobile telecommunications system (UMTS) band 5 (B5) and evolved UMTS terrestrial radio access (E-UTRA) band 13 (B13). The frequency spectrum of FIG. 1 illustrates the impact of the $IM3_{up}$ and $IM3_{down}$ products generated by the simultaneous transmission of the signals A and B. Nonlinearity of electronic components is especially problematic in the case of SV-LTE because certain transmit channel combinations result in IM3 products that fall directly within the pass bands of the receivers. Therefore, unless such IM3 products can be dramatically reduced, receivers impacted by the IM3 products can be severely de-sensed and a mobile terminal that incorporates the impacted receivers will become essentially useless as long as the IM3 products are present.

FIG. 2 is a circuit diagram of a structure for a related art RF switch 10 that comprises nonlinear components in the form of field effect transistors (FETs) 12 that are stacked in series for enhanced voltage handling capabilities. The RF switch 10 has a receive/transmit (RX/TX) terminal 14 and an antenna terminal 16. A transceiver (not shown) is typically coupled to the RX/TX terminal 14, and an antenna (not shown) is typically coupled to the antenna terminal 16. The FETs 12 are practically identical with the exception of parasitic compensation (not shown) to maintain an equal voltage drop across each of the FETs 12. To date, the wireless industry has struggled for a solution to the problem of receiver de-sense due to IM3 products generated by nonlinear components such as the FETs 12.

FIG. 3 is a diagram illustrating a related art approach for reducing power in the IM3 products generated by a first nonlinear switch 18 and a second nonlinear switch 20. The first nonlinear switch 18 and the second nonlinear switch 20 each typically have the structure of the related art RF switch 10 (FIG. 2). A first antenna 22 is used for transmission and reception of signals in a first band (B5) and a second antenna 24 is used for transmission and reception of a second band (B13). Since the first antenna 22 and the second antenna 24 can be designed to provide ~10 dB of isolation, the resulting IM3 products can be reduced proportionally. However, even a 10 dB reduction in IM3 products requires a linearity that is on the order of 10-20 dB higher than current state-of-the-art electronic components such as the first nonlinear switch 18 and the second nonlinear switch 20. As such, there remains a need for additional intermodulation suppression to further reduce IM3 products generated by nonlinear electronic components.

SUMMARY

The present disclosure provides an RF system for suppressing third-order intermodulation (IM3) products. The RF system of the present disclosure is made up of a plurality of branches coupled in parallel. Each of the plurality of branches includes a positive phase shift network, a negative phase shift network and nonlinear components, wherein the nonlinear components are coupled between the positive phase shift network and the negative phase shift network. The RF system also includes a null offset branch having nonlinear components that are coupled in parallel with the plurality of branches. Phase offsets provided by the positive phase shift network and the negative phase shift network of each of the plurality of branches have the same magnitude but opposite polarities, while phase offsets provided by the positive phase shift network and the negative phase shift network of different ones of the plurality of branches have different magnitudes. The different magnitudes of the phase offsets are selected to cause at least some of the IM3 products generated by and propagating through the RF system to substantially cancel.

In one embodiment, the nonlinear components are series stacked field effect transistors (FETs) that comprise an RF switch having a switch segment for the null offset branch and a switch segment for each of the plurality of branches. The RF switch further includes a control terminal for turning the switch segment of the null offset branch on and off, and for turning the switch segment of each of the plurality of branches on and off. Although the disclosure is directed mainly towards RF systems such as RF switches, the concepts disclosed are applicable to RF systems comprising nonlinear components other than RF switches. For the purpose of this disclosure RF systems include nonlinear components that can be, but are not limited to filters, duplexers, RF switches and combinations thereof.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 6A:
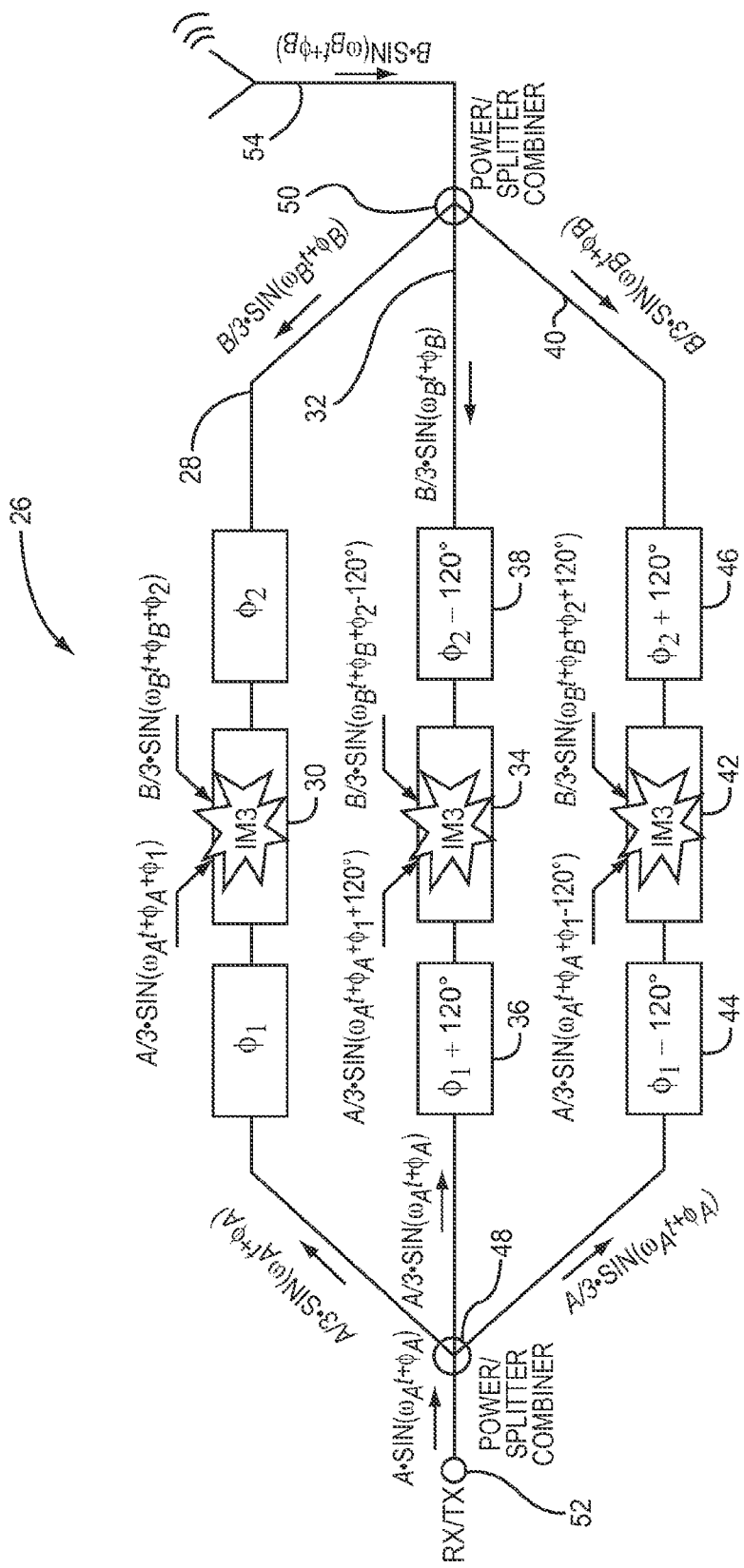
Figure 6B:
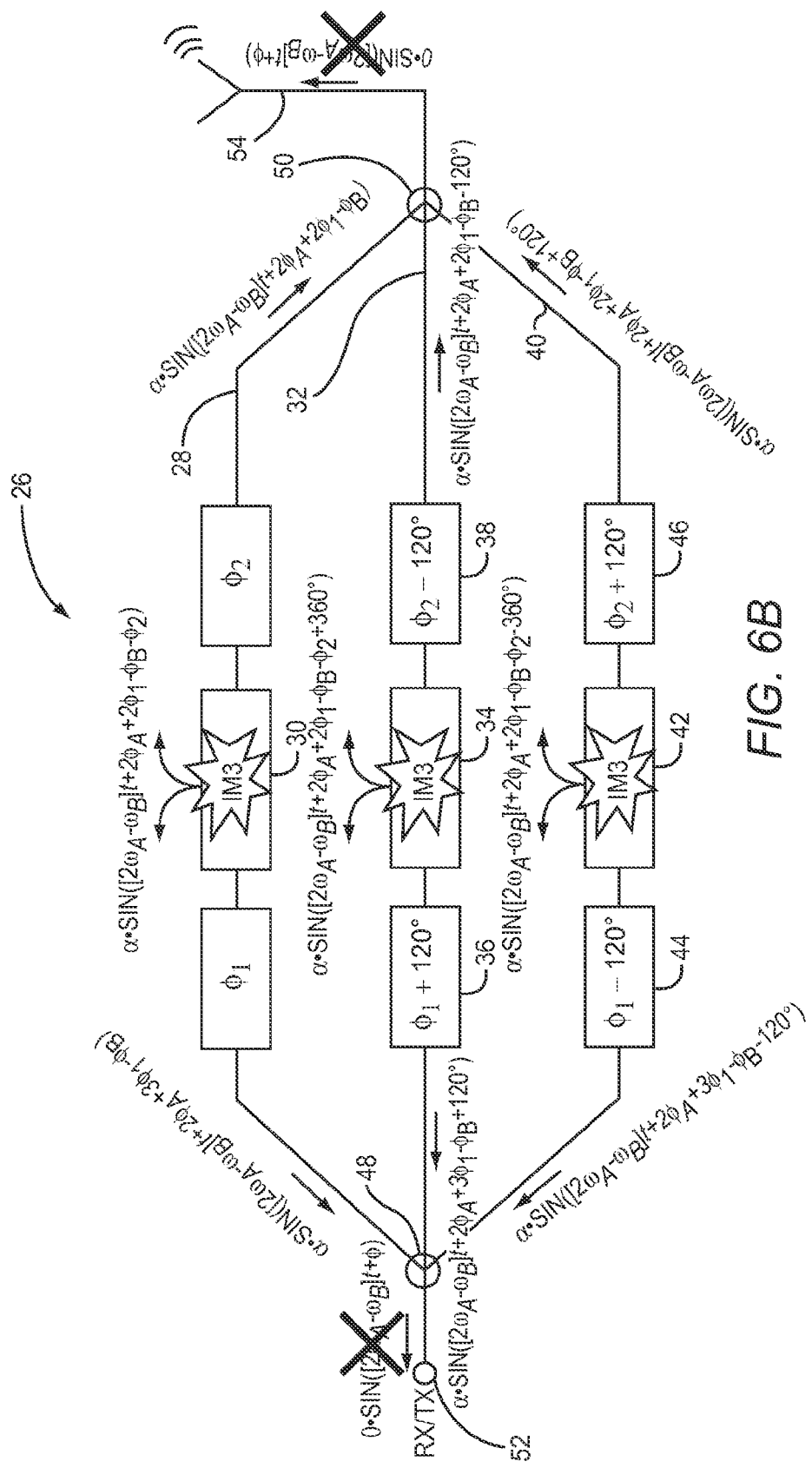
Figure 6C:
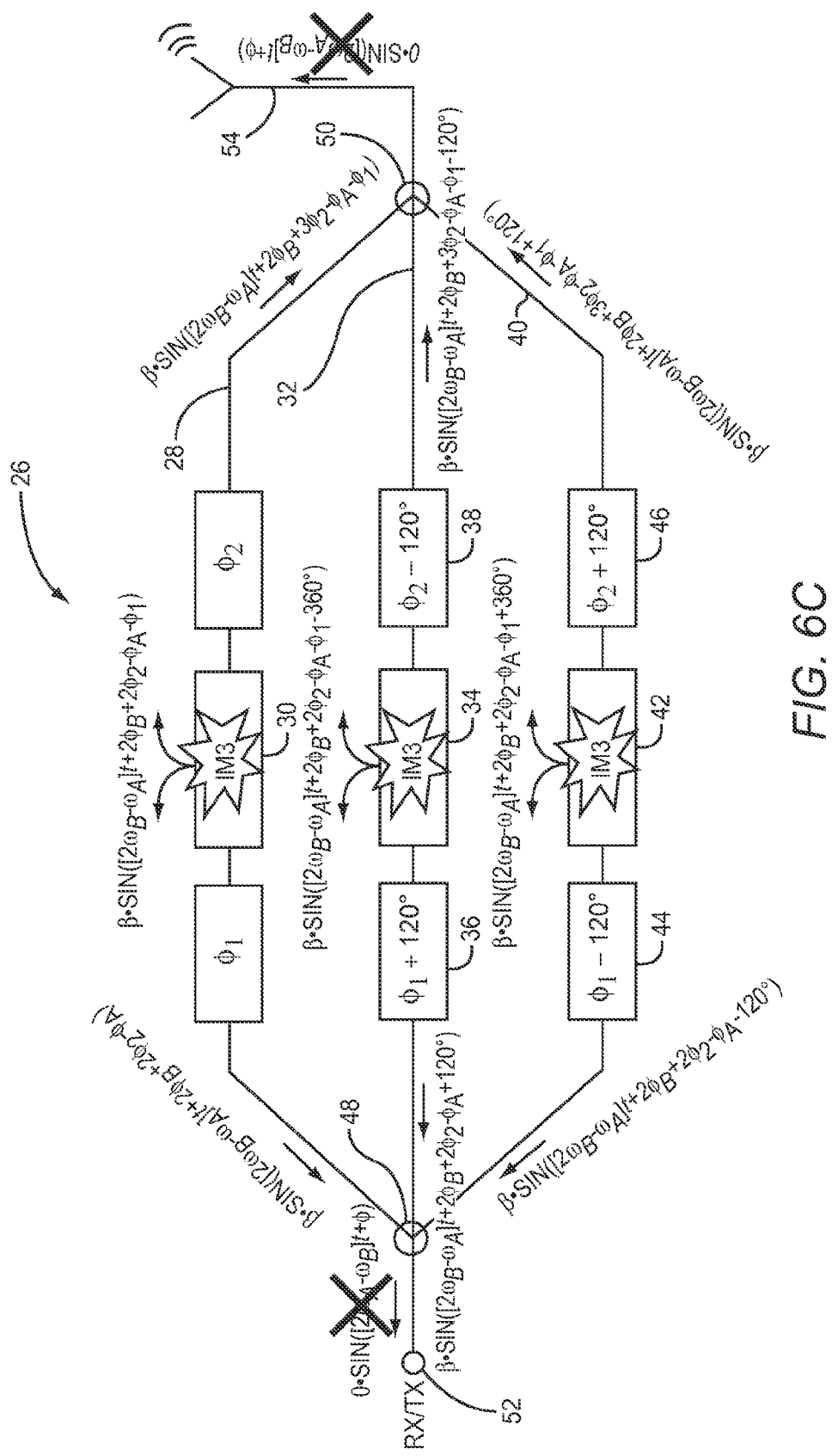

FIGS. 6A, 6B, and 6C are switch diagrams that illustrate the suppression of IM3 products using phase shift networks that provide a +120° phase offset angle and a −120° phase offset angle.

Figure 7A:
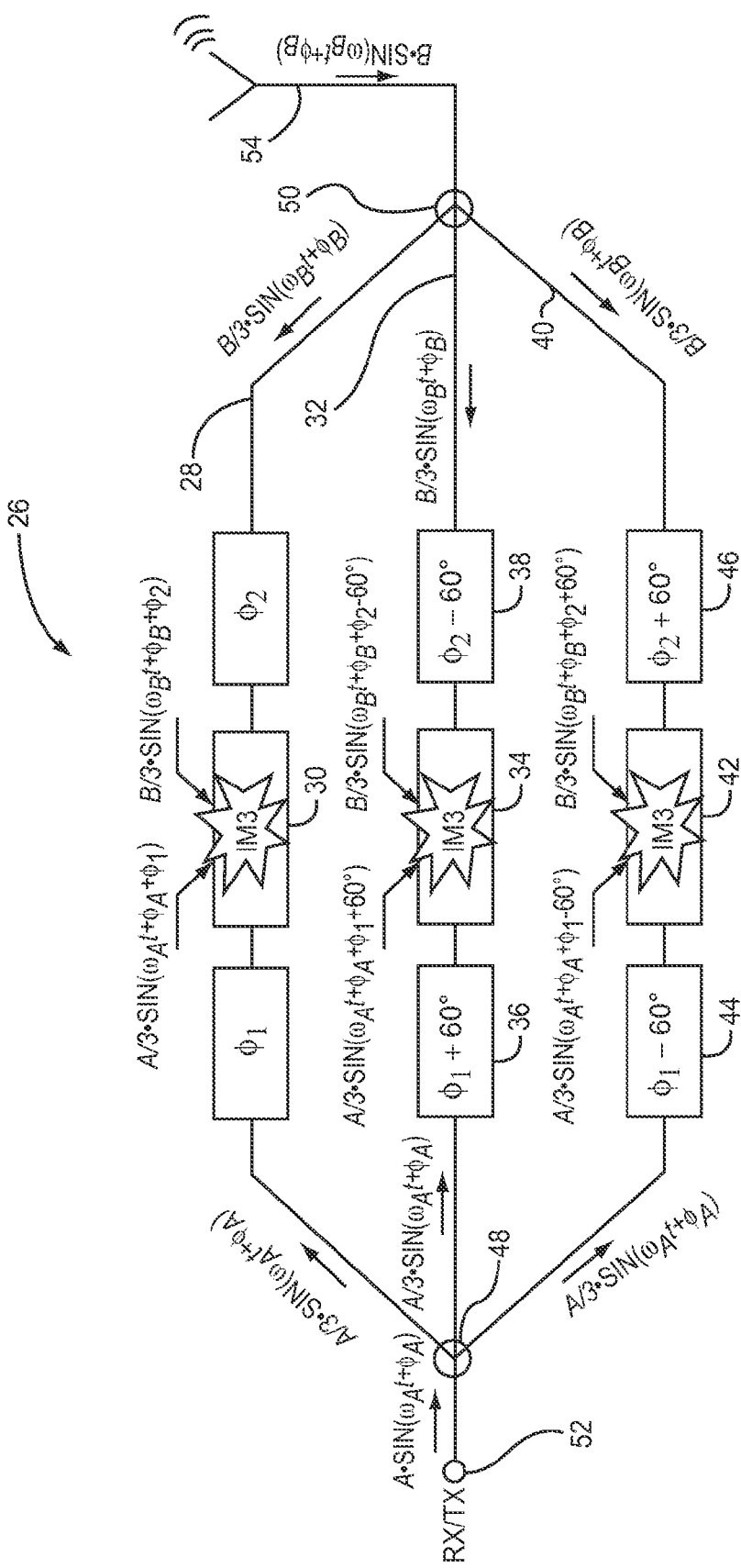
Figure 7B:
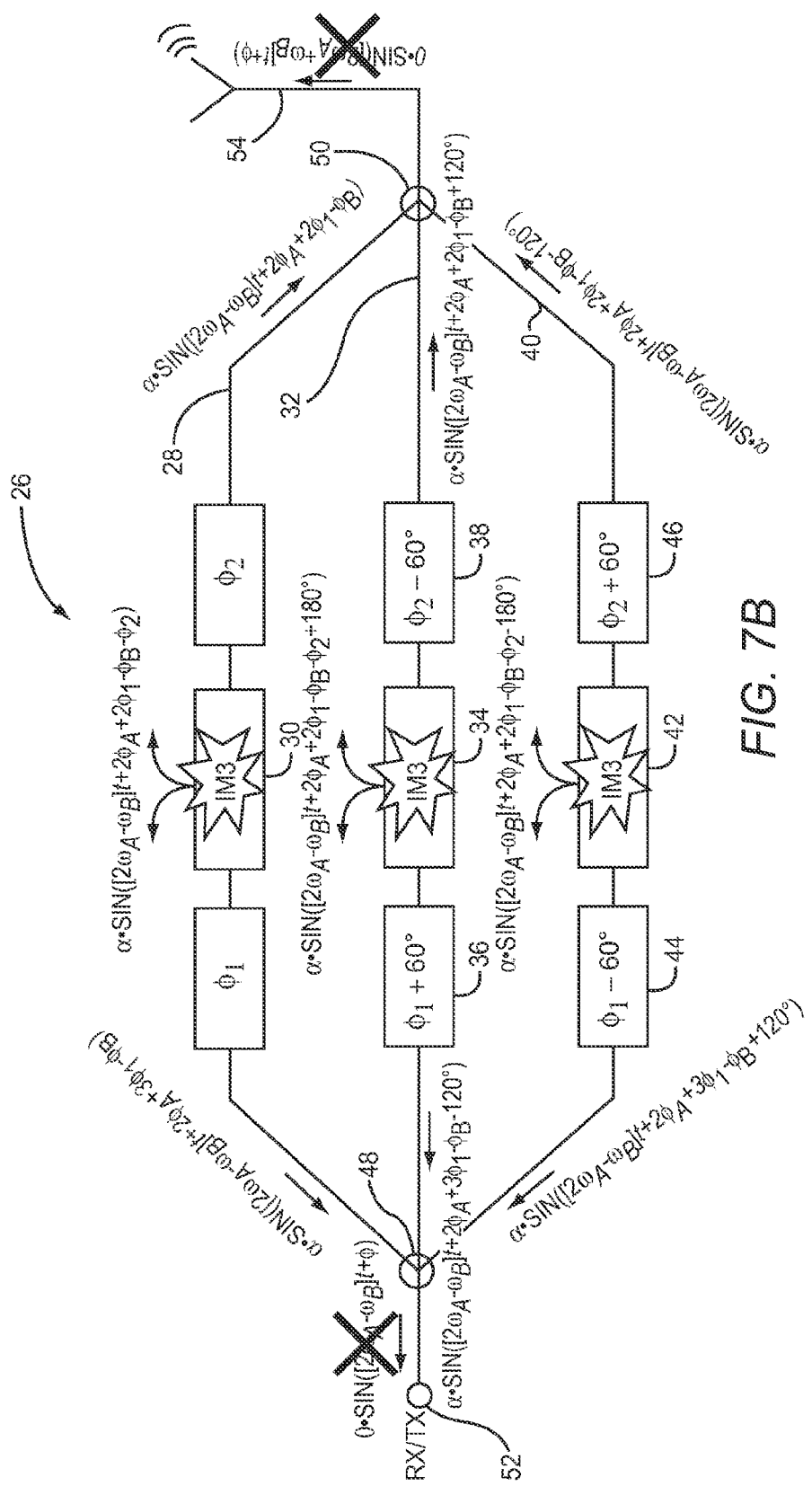
Figure 7C:
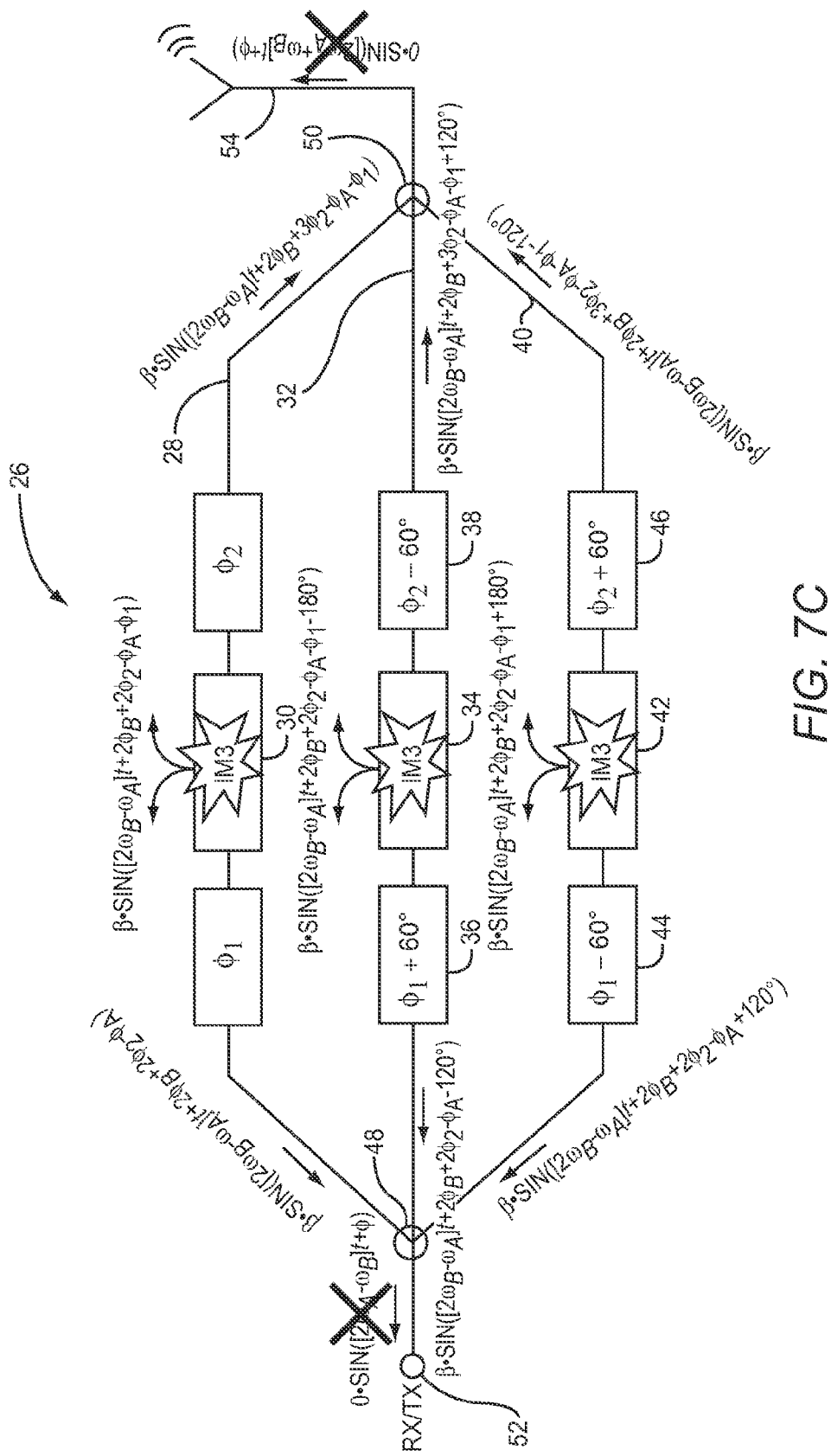

FIGS. 7A, 7B, and 7C are switch diagrams that illustrate the suppression of IM3 products using phase shift networks that provide a +60° phase offset angle and a −60° phase offset angle.

Figure 8A:
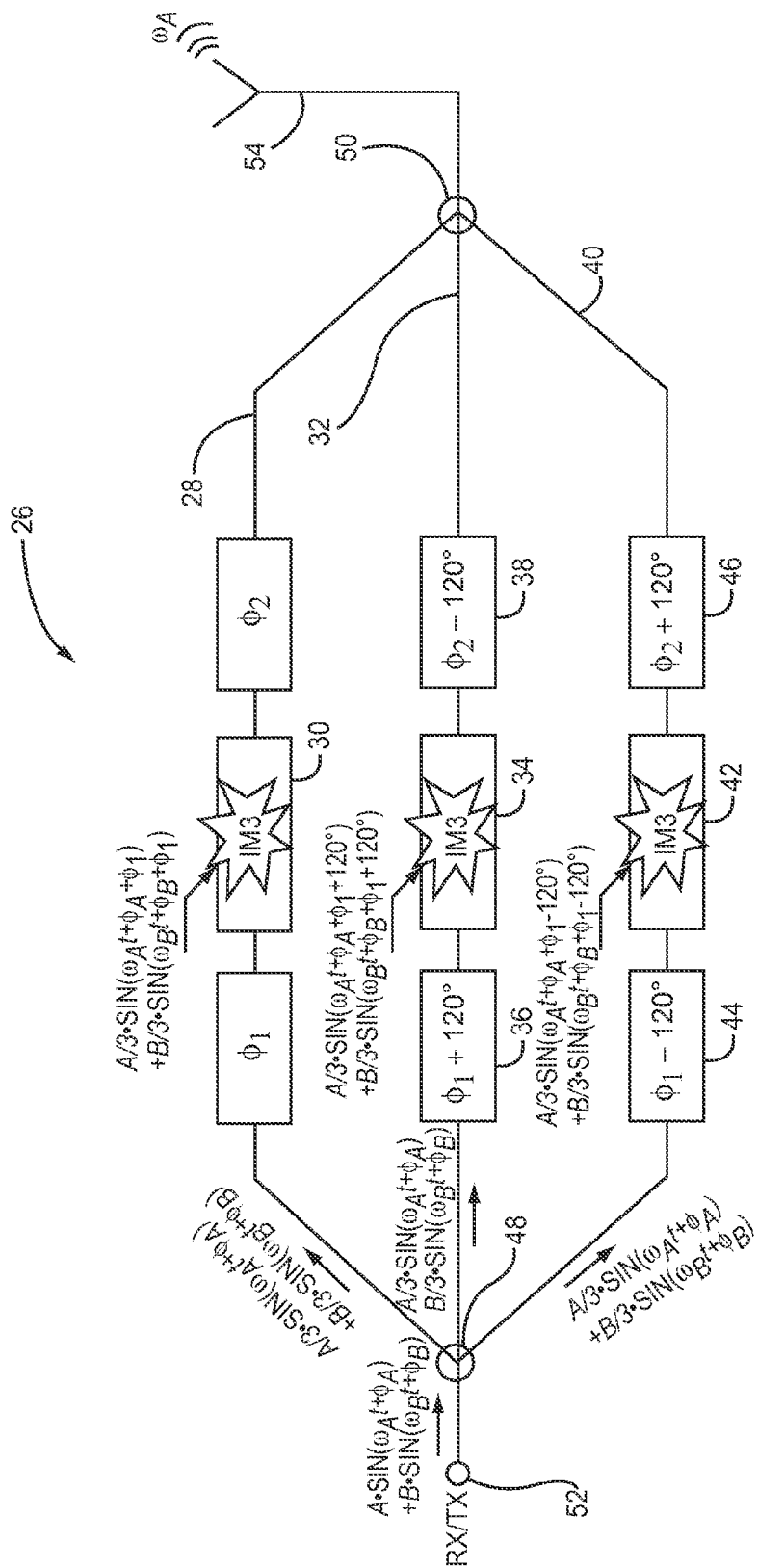
Figure 8B:
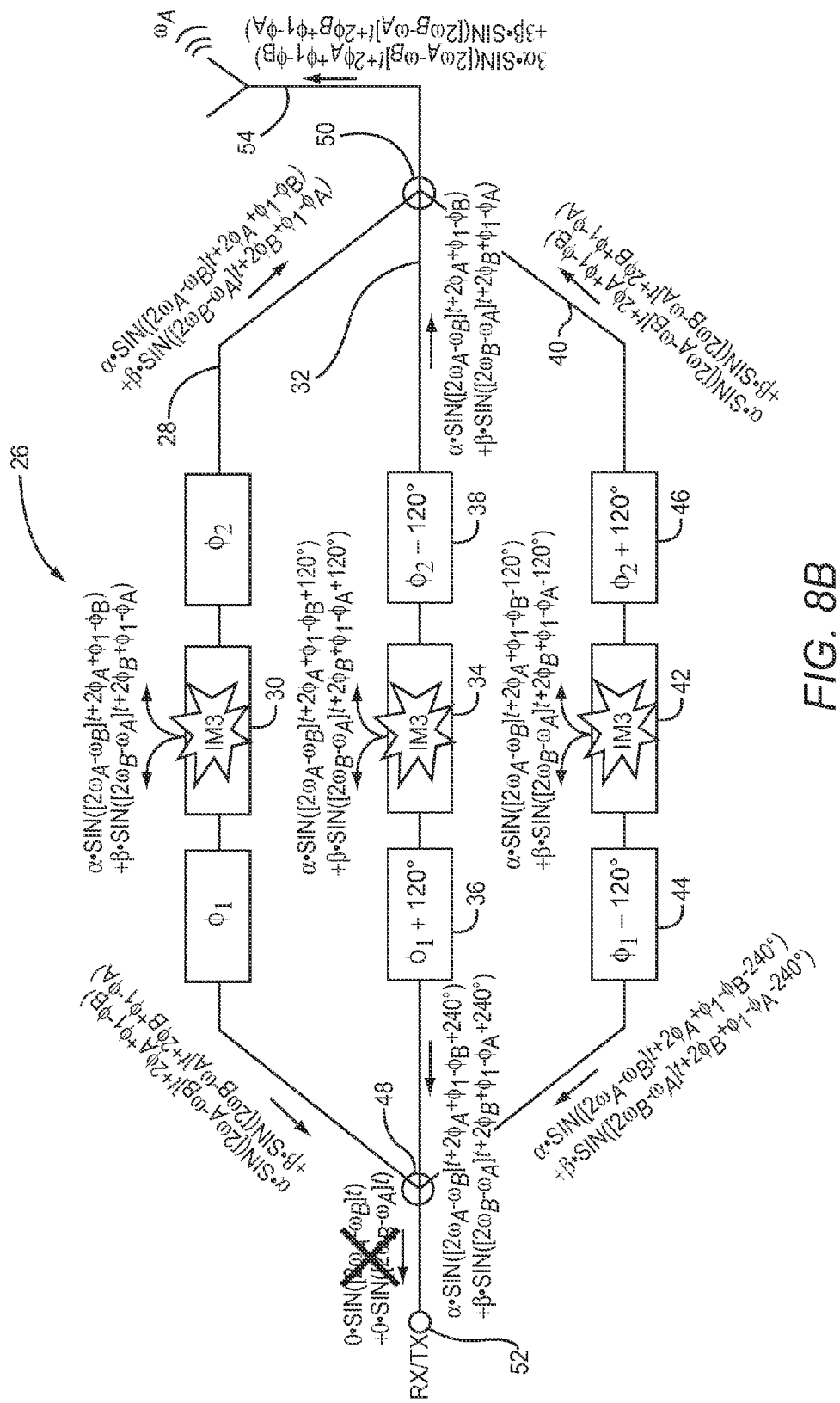

FIGS. 8A and 8B are switch diagrams that illustrate the suppression of IM3 products resulting from high power signals originating from a same direction.

Figure 9:
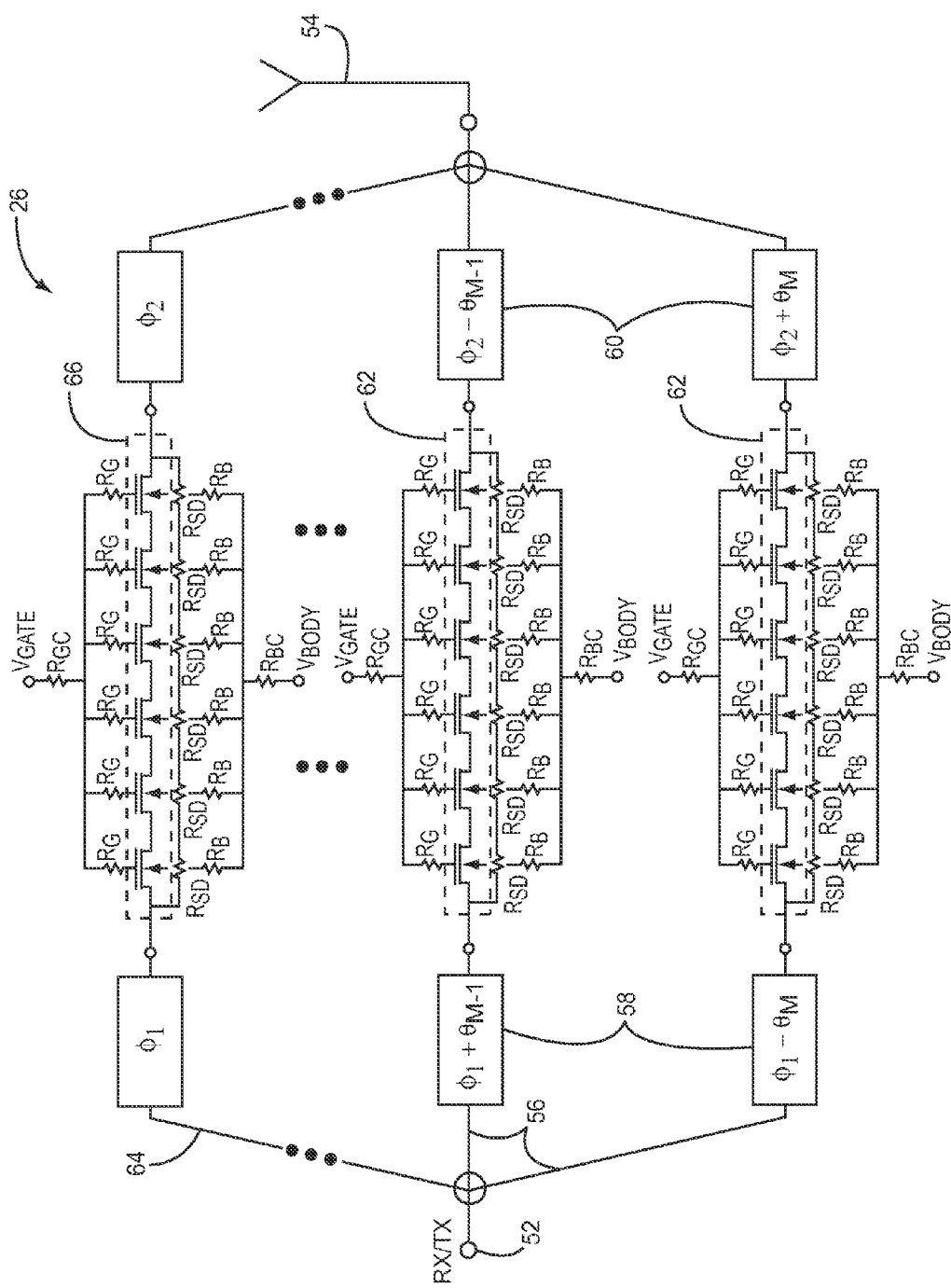

FIG. 9 is a circuit diagram of an RF switch that is in accordance with the present disclosure.

Figure 1:
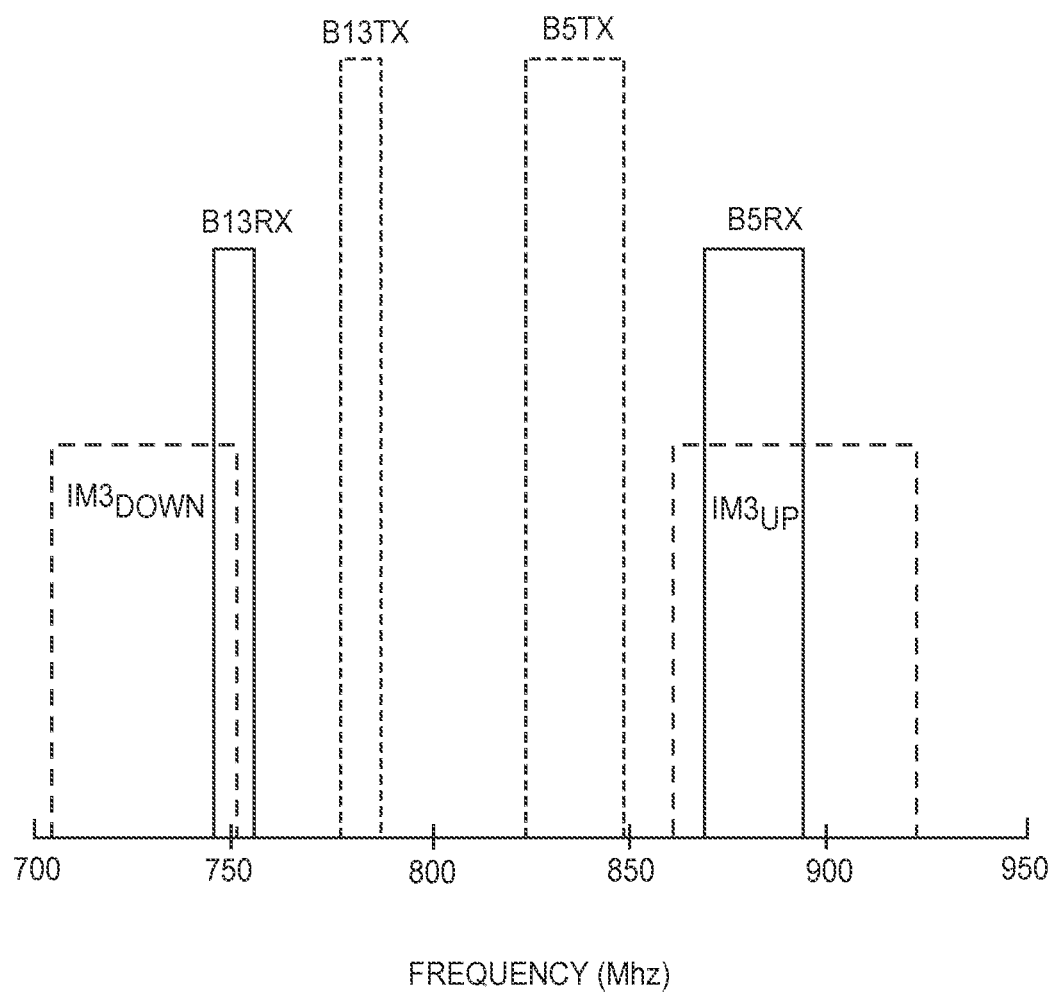
FIG. 1 is a frequency spectrum diagram for universal mobile telecommunications system (UMTS) band 5 and evolved UMTS terrestrial radio access (E-UTRA) Band 13 that illustrates the impact of undesirable third order intermodulation (IM3) products on receive (RX) bands.
Figure 2:
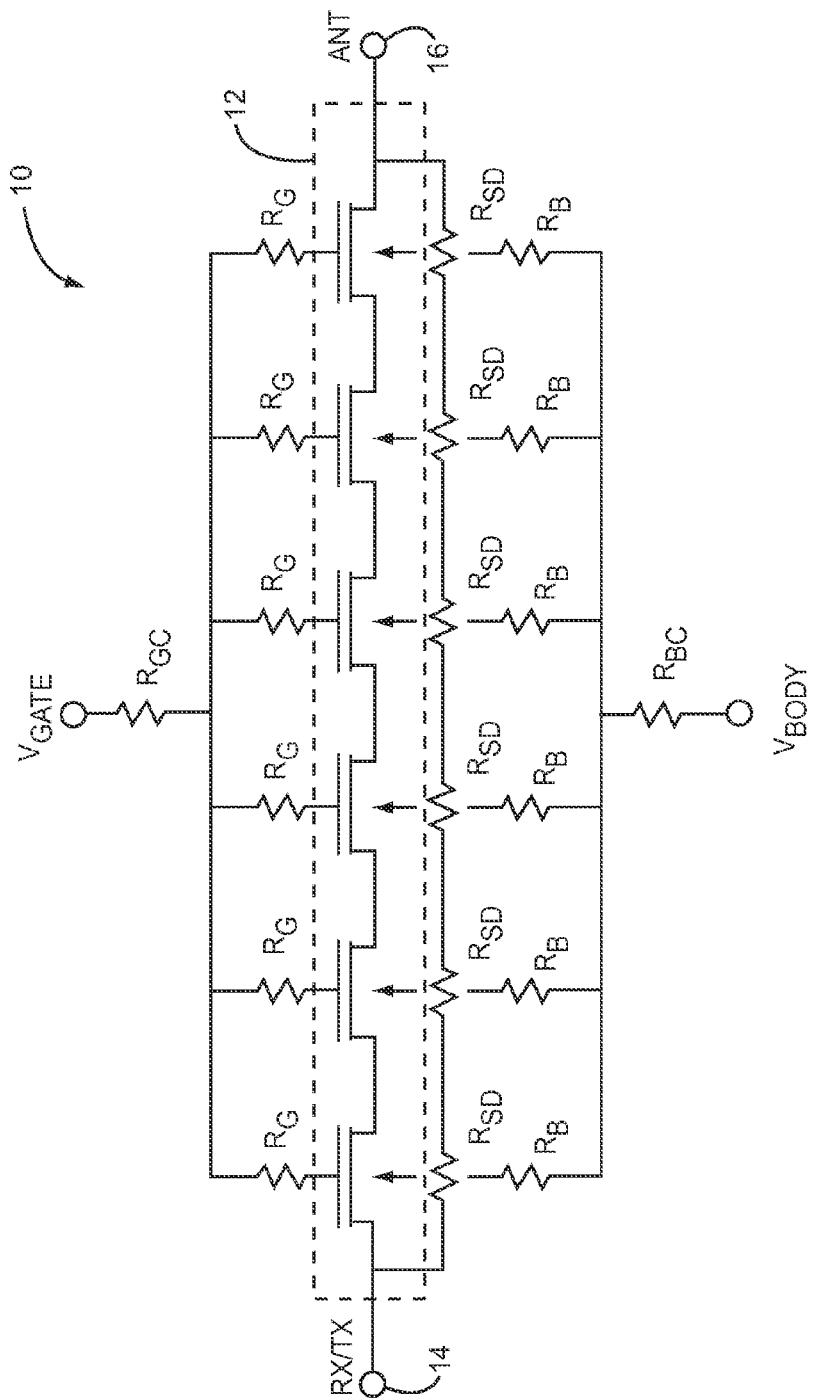
FIG. 2 is a circuit diagram for a related art RF switch having six stacked field effect transistors (FETs) for enhanced voltage handling capability
Figure 3:
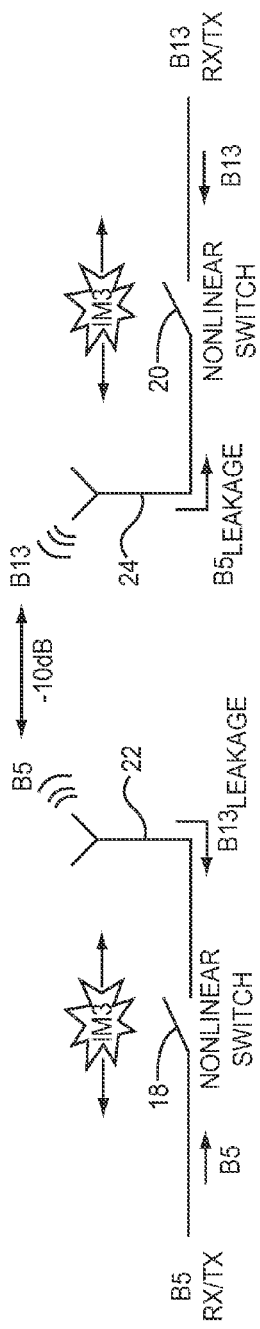
FIG. 3 is a diagram illustrating a related art attempt at relaxing RF switch linearity requirements by utilizing separate antennas transmit and receive paths for the Band 5 (B5) and Band 13 (B13).
Figure 10A:
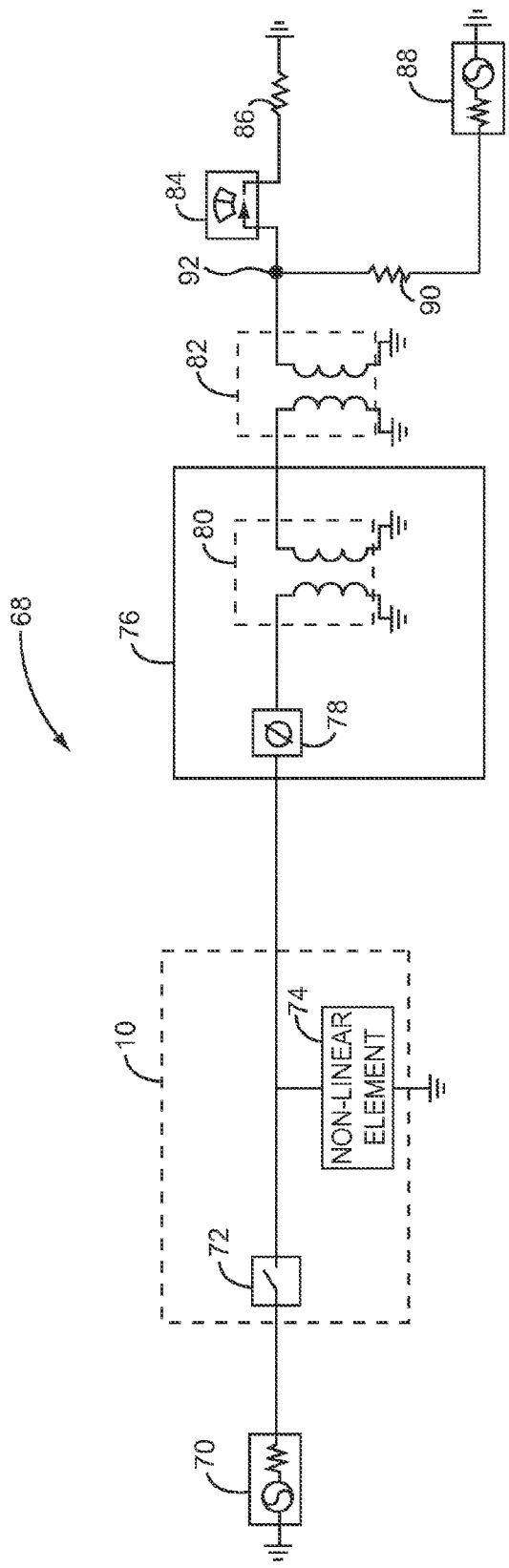

FIG. 10A is a schematic diagram for a simulator configuration that is usable to simulate the related art RF switch depicted in FIG. 2.

Figure 10B:
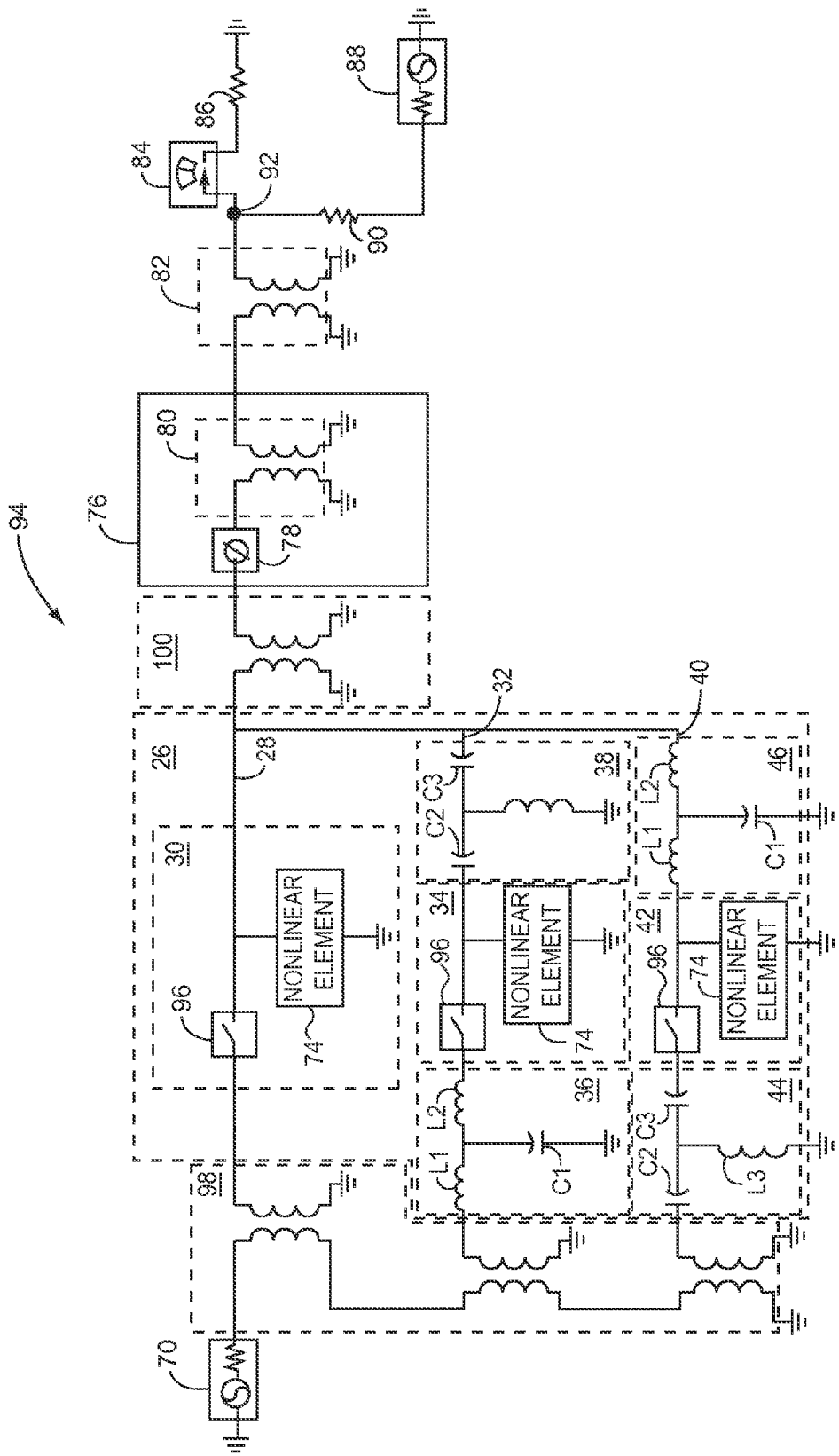

FIG. 10B is a schematic diagram for a simulator configuration that is usable to simulate an embodiment of an RF switch according to the present disclosure.

Figure 11A:
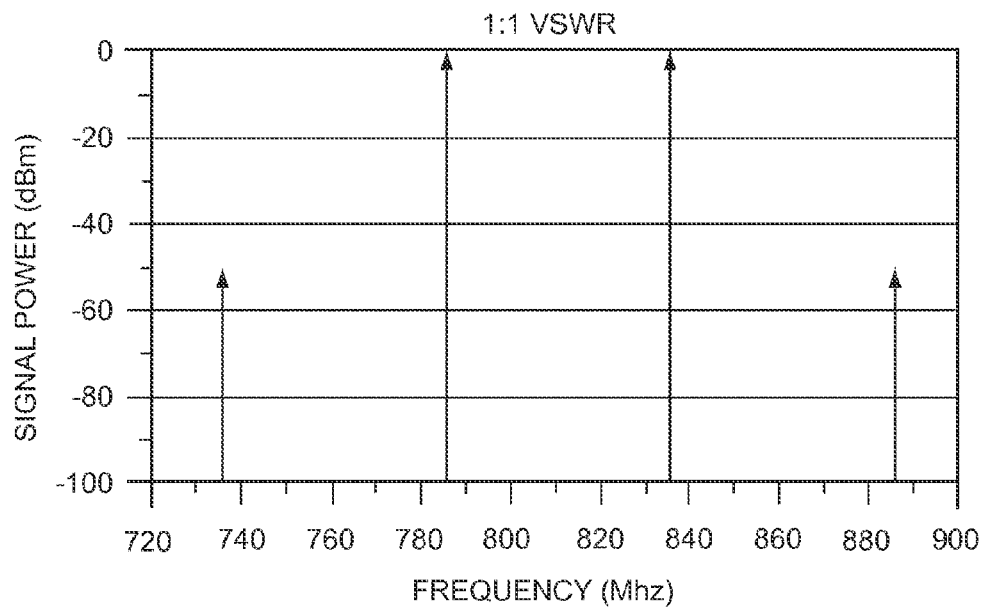

FIG. 11A is a spectral plot of IM3 products generated by a related art RF switch coupled to an antenna having an ideal 1:1 voltage standing wave ratio (VSWR).

Figure 11B:
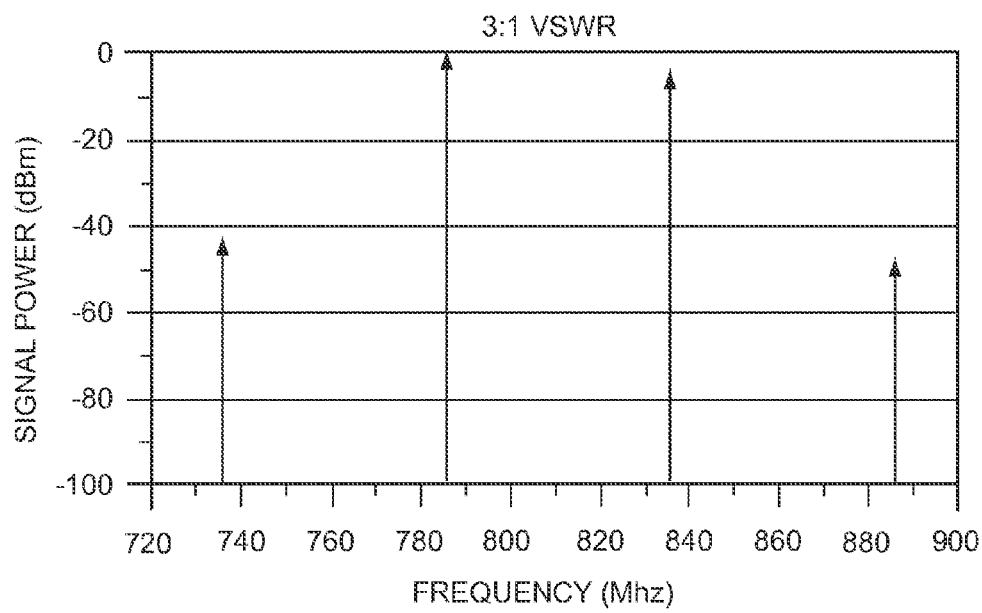

FIG. 11B is a spectral plot of IM3 products generated by a related art RF switch coupled to an antenna having a worst-case 3:1 VSWR mismatch.

Figure 11C:
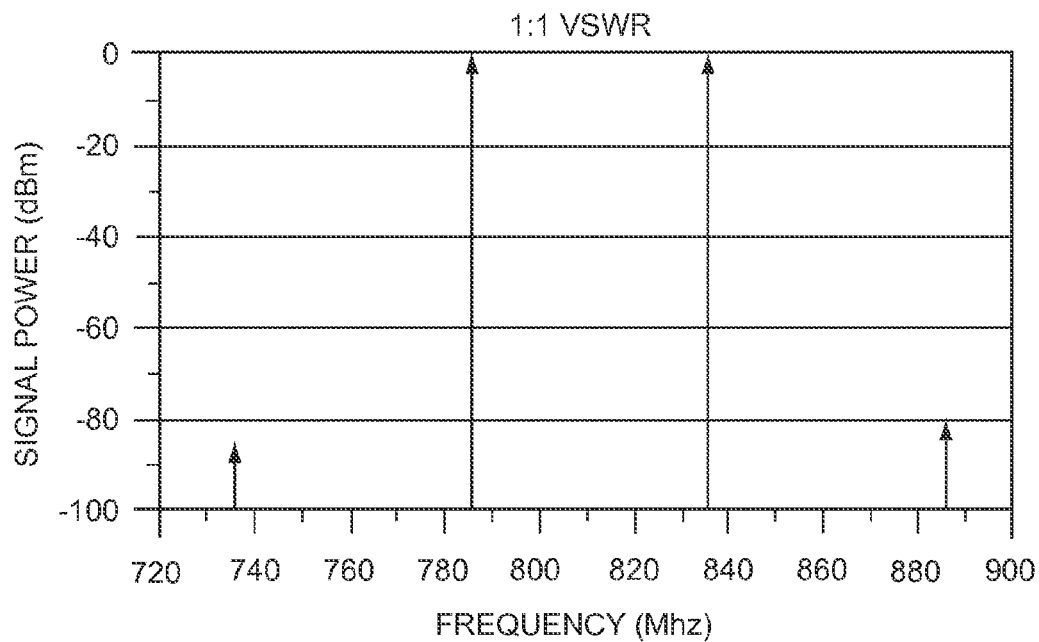

FIG. 11C is a spectral plot of IM3 products generated by an RF switch of the present disclosure that is coupled to an antenna having an ideal 1:1 VSWR.

Figure 11D:
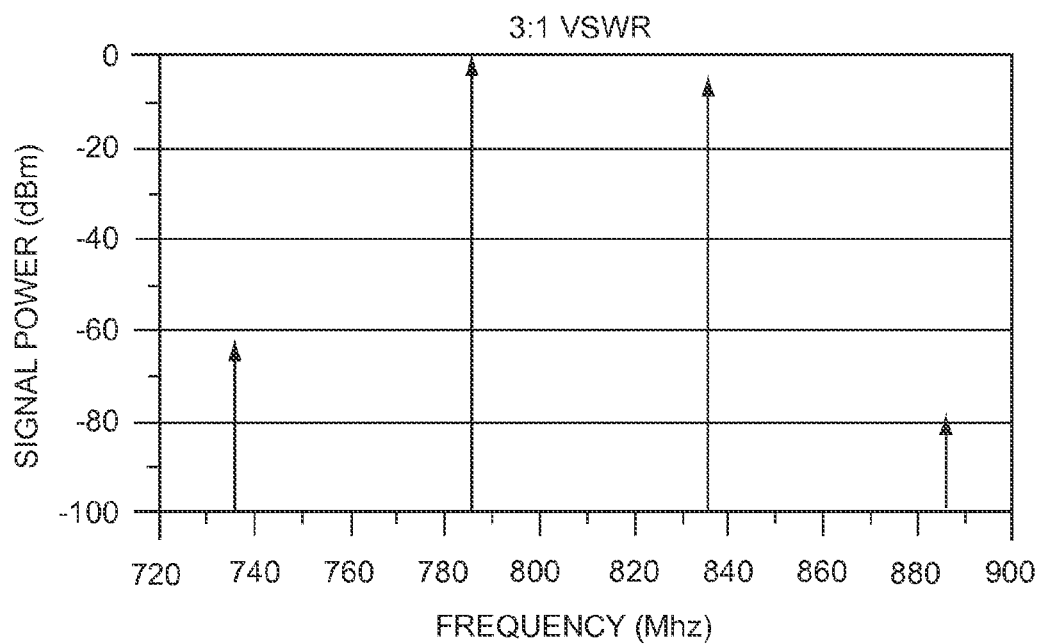

FIG. 11D is a spectral plot of IM3 products generated by an RF switch of the present disclosure that is coupled to an antenna having a worst-case VSWR mismatch.

Figure 12:
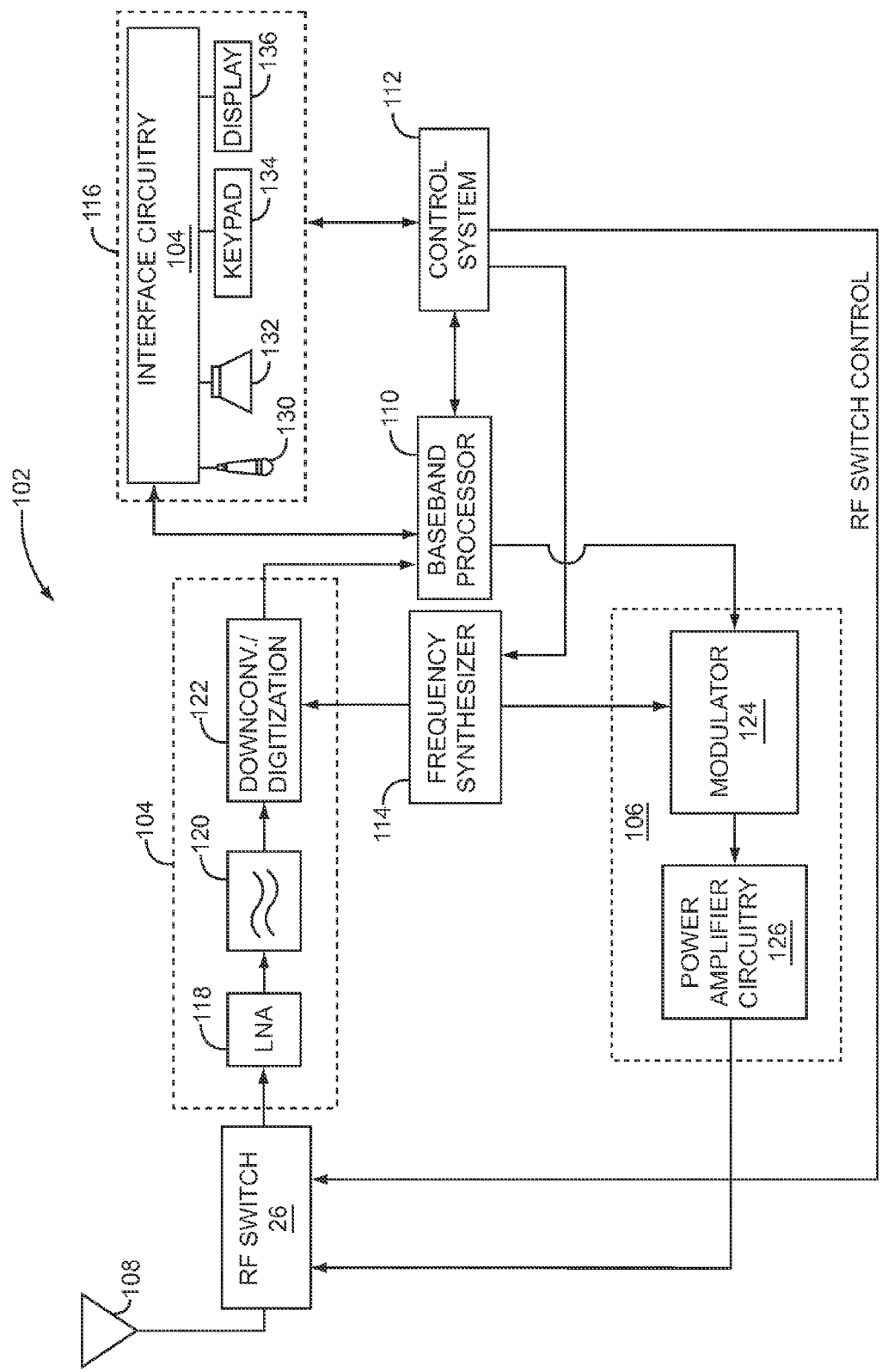

FIG. 12 is a block diagram of a mobile terminal that incorporates an embodiment of an RF switch of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 4:
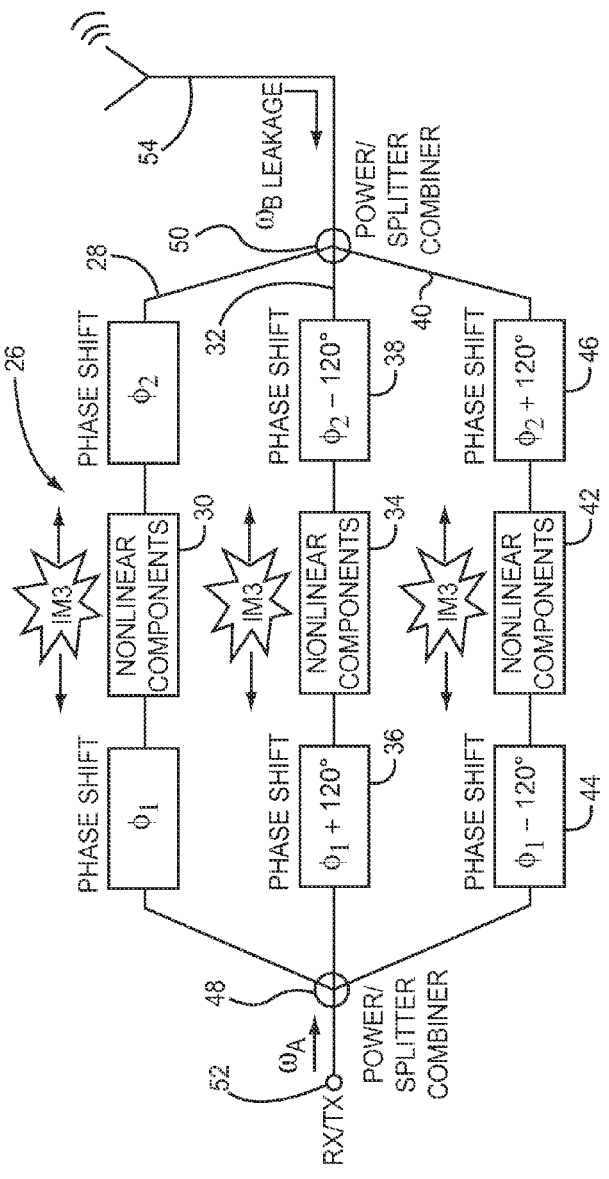
FIG. 4 is a switch diagram of an embodiment according to the present disclosure that provides an RF switch comprising parallel RF switch segments with phase shift networks for suppressing IM3 products.

FIG. 4 is a switch diagram of an embodiment according to the present disclosure that provides an RF switch 26 for suppressing IM3 products generated as RF signals propagate through the RF switch 26. The RF switch 26 includes a null offset branch 28 having a first switch segment 30. Signals propagating through the RF switch 26 acquire a first inherent phase shift $\Phi_1$ and a second inherent phase shift $\Phi_2$ from inductive, resistive and capacitive parasitic elements associated with transmission lines (not shown) that are signal paths through the RF switch 26. A second branch 32 includes a second switch segment 34, a first positive phase shift network 36 for shifting the IM3 products propagating through the second branch 32 by the first inherent phase shift $\Phi_1$ plus a positive offset angle of +120°, and a first negative phase shift network 38 for shifting the IM3 products propagating through the second branch 32 by the second inherent phase $\Phi_2$ and a negative offset angle of −120°. A third branch 40 includes a third switch segment 42, a second negative phase shift network 44 having a negative offset angle of −120° for shifting the IM3 products propagating through the third branch 40 by the first inherent phase $\Phi_1$ plus the negative offset angle of −120°, and a second positive phase shift network 46 having a positive phase offset angle of +120° for shifting the IM3 products propagating through the third branch 40 by the second inherent phase $\Phi_2$ plus the positive offset angle of +120°. The null offset branch 28, the second branch 32, and the third branch 40 are adapted to be coupled between a first power splitter/combiner 48 and a second power splitter/combiner 50. A receive/transmit (RX/TX) terminal 52 is communicatively coupled to the first power splitter/combiner 48 and an antenna 54 is coupled to the second power splitter/combiner 50.

Figure 5A:
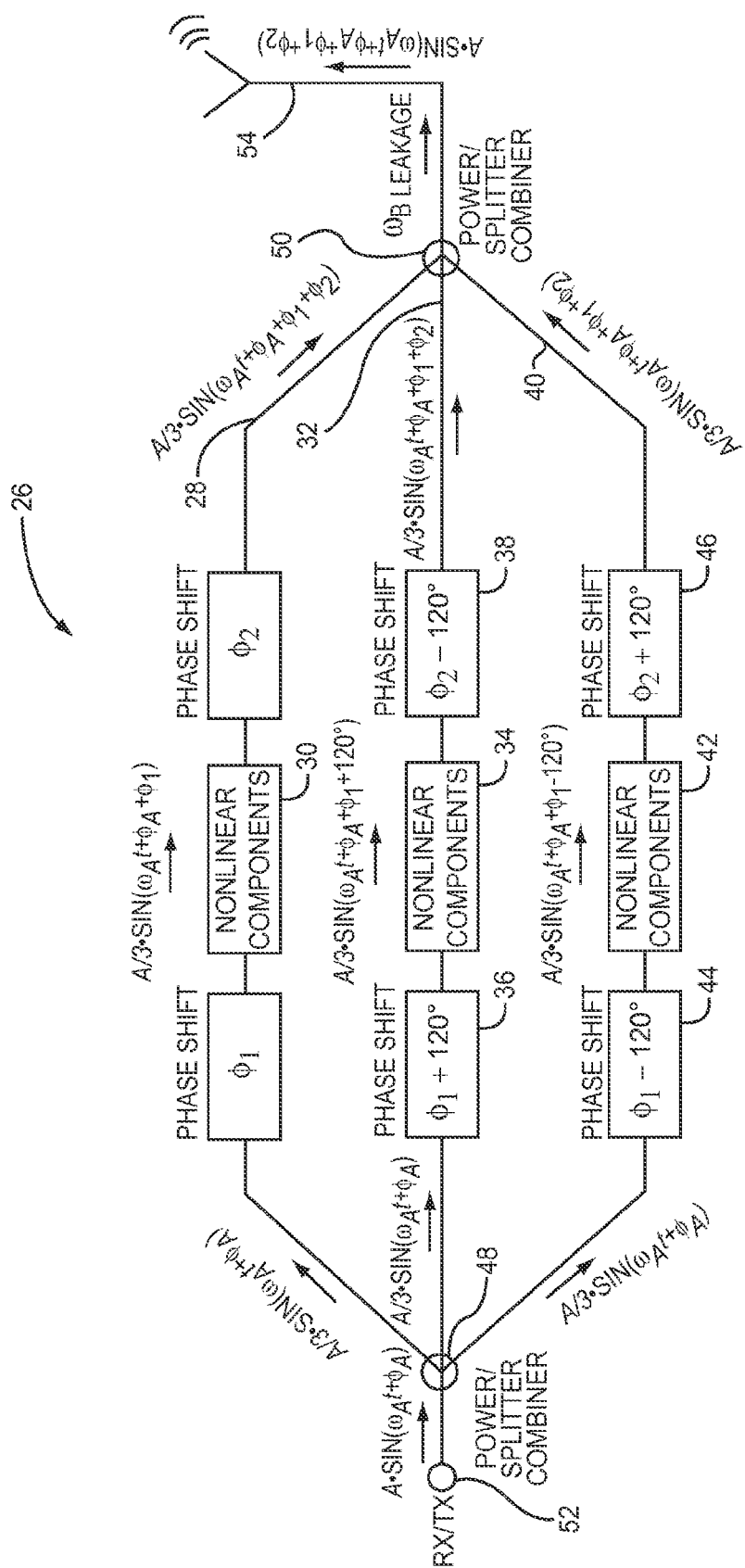
FIG. 5A is a switch diagram illustrating a transmit (TX) signal propagating through the RF switch of FIG. 4.

FIG. 5A is a switch diagram illustrating a transmit (TX) signal propagating through the RF switch 26. In an exemplary case, the TX signal is a sinusoidal signal in the form A·sin($\omega_A t+\phi_A$), where A is amplitude, $\omega_A t$ is an angular frequency term, and $\Phi_A$ is a phase angle. The TX signal propagates through the RX/TX terminal 52 and into the first power splitter/combiner 48 where the TX signal is split into three equal portions that are each equal to A/3·sin($\omega_A t+\phi_A$). Each of the three equal portions of the TX signal propagates through a corresponding one of the null offset branch 28, the second branch 32, and the third branch 40. Each of the three equal portions of the TX signal acquire the first inherent phase shift $\Phi_1$ and the second inherent phase shift $\Phi_2$ before recombining in the second power splitter/combiner 50. A recombined TX signal has the form A·sin($\omega_A t+\phi_A+\phi_1+\phi_2$) that is transmitted from the antenna 54. The additional phase shifts of the first inherent phase $\Phi_1$ and the second inherent phase $\Phi_2$ do not affect communication of the TX signal.

Figure 5B:
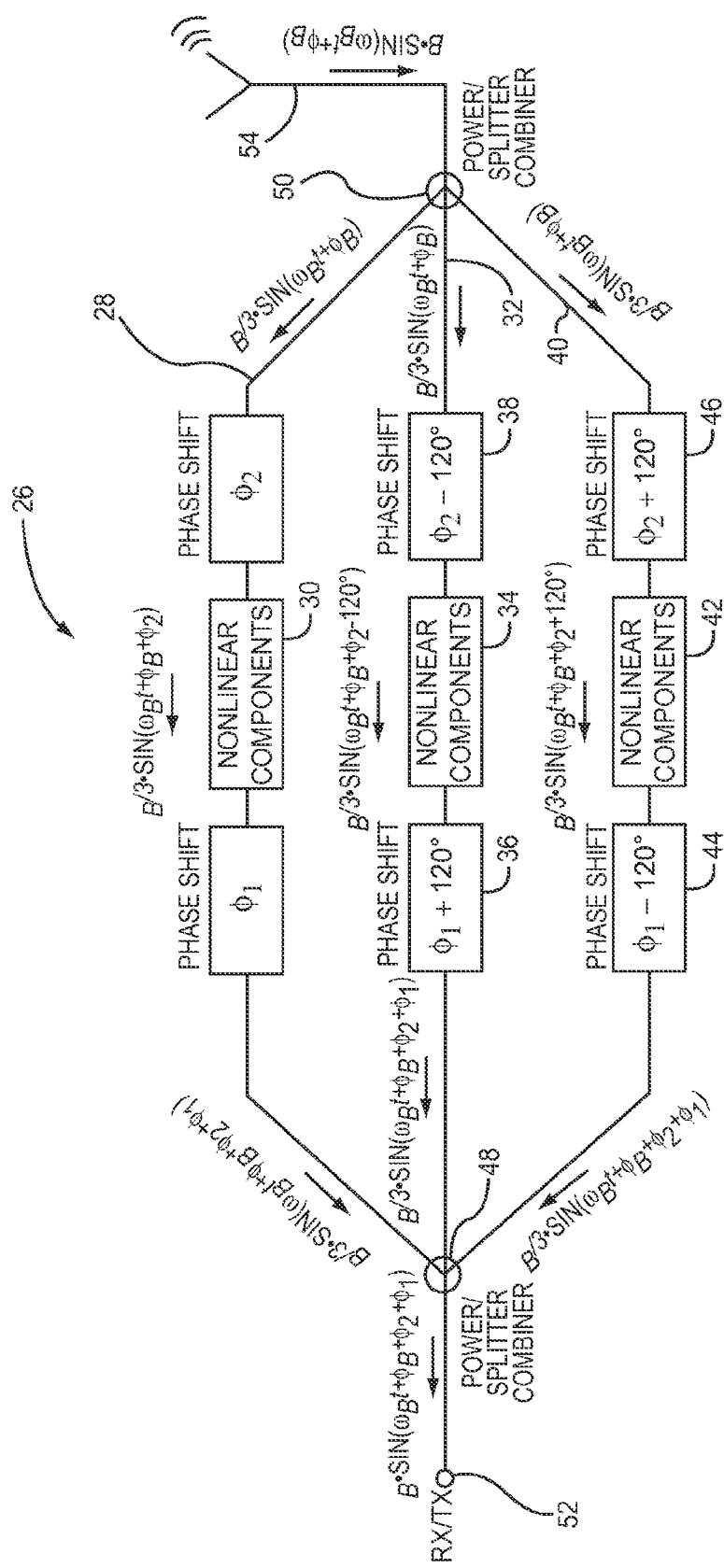
FIG. 5B is a switch diagram illustrating a receive (RX) signal propagating through the RF switch of FIG. 4.

FIG. 5B is a switch diagram illustrating an RX signal propagating through the RF switch 26. In an exemplary case, the RX signal is a sinusoidal signal in the form B·sin($\omega_B t+\phi_B$), where B is amplitude, $\omega_B t$ is an angular frequency term, and $\Phi_B$ is a phase angle. The RX signal propagates through the antenna 54 and into the second power splitter/combiner 50 where the RX signal is split into three equal portions that are each equal to B/3·sin($\omega_B t+\phi_B$). Each of the three equal portions of the RX signal propagates through a corresponding one of the null offset branch 28, the second branch 32, and the third branch 40. Each of the three equal portions of the RX signal acquire the first inherent phase shift $\Phi_1$ and the second phase angle $\Phi_2$ before recombining in the first power splitter/combiner 48. A recombined RX signal has the form B·sin($\omega_B t+\phi_A+\phi_1+\phi_2$) that is received by a receiver (not shown) that is typically coupled to the RX/TX terminal 52. As with the TX signal, the additional phase shifts of the first inherent phase shift $\Phi_1$ and the second inherent phase shift $\Phi_2$ do not affect communication of the RX signal.

FIGS. 6A, 6B, and 6C are switch diagrams that illustrate the suppression of IM3 products. In particular, FIG. 6A depicts the TX signal in the form of A·sin($\omega_A t+\phi_A$) propagating through the RX/TX terminal 52 and into the first power splitter/combiner 48 where the TX signal is split into three portions equal to A/3·sin($\omega_A t+\phi_A$). Concurrently, the RX signal in the form of B·sin($\omega_B t+\phi_B$) is captured by the antenna 54 where it propagates into the second power splitter/combiner 50 where the RX signal is split into three equal portions equal to B/3·sin($\omega_B t+\phi_B$). The TX signal portion propagating through the null offset branch 28 acquires the first inherent phase shift $\Phi_1$ before propagating into the first switch segment 30. The RX signal portion propagating through the null offset branch 28 acquires the second inherent phase $\Phi_2$ before propagating into the first switch segment 30. The TX signal portion propagating through the second branch 32 acquires the first inherent phase $\Phi_1$ plus the positive offset angle of +120° before propagating into the second switch segment 34. The RX portion propagating through the second branch 32 acquires the second inherent phase $\Phi_2$ plus the negative offset angle of −120° before propagating into the second switch segment 34. The TX signal portion propagating through the third branch 40 acquires the first inherent phase $\Phi_1$ plus the negative offset angle of −120° before propagating into the third switch segment 42. The RX portion propagating through the third branch 40 acquires the second inherent phase $\Phi_2$ plus the positive offset angle of +120° before propagating into the third switch segment 42.

Referring now to expression (10) in the background section above along with FIGS. 6B and 6C, the IM3 products generated in the null offset branch 28 of the RF switch 26 are α·sin($[2\omega_A-\omega_B]t+2\phi_A+2\phi_1-\phi_B-\phi_2$) and β·sin($[2\omega_B-\omega_A]t+2\phi_B+2\phi_2-\phi_A-\phi_1$), where α and β are amplitudes. Coefficients of expression (10) and expression (3) of the background section include losses which may occur in the RF switch 26 along with the reduction in amplitudes due to the first power splitter/combiner 48 and the second power splitter/combiner 50.

IM3 products generated in the second switch segment 34 of the second branch 32 are α·sin($[2\omega_A-\omega_B]t+2\phi_A+2\phi_1-\phi_B-\phi_2+$ 360°) and $\beta \cdot \sin([2\omega_B-\omega_A]t+2\phi_B+2\phi_2-\phi_A-\phi_1-360°)$. Simultaneously, IM3 products generated in the third switch segment 42 of the third branch 40 are $\alpha \cdot \sin([2\omega_A-\omega_B]t+2\phi_A+2\phi_1-\phi_B-\phi_2-360°)$ and $\beta \cdot \sin([2\omega_B-\omega_A]t+2\phi_B+2\phi_2-\phi_A-\phi_1+360°)$. Since the ±360° phase shifts are indistinguishable from 0°, the IM3 products generated in first switch segment 30, the second switch segment 34, and the third switch segment 42 at frequency $2\omega_A-\omega_B$ are equal and in phase. Likewise, so are the IM3 products at frequency $2\omega_B-\omega_A$.

At this point, the newly generated IM3 products propagate towards the antenna 54 and towards the RX/TX terminal 52, as indicated by the arrows in FIGS. 6B and 6C. While propagating towards the antenna 54, the IM3 products in the second branch 32 pass back through the first negative phase shift network 38, thereby imparting an extra phase shift of −120° to the IM3 products. Similarly, while propagating towards the antenna 54, the IM3 products in the third branch 40 pass back through the second positive phase shift network 46, thereby imparting an extra phase shift of +120° to the IM3 products. No extra phase shift is imparted to the IM3 products in the null offset branch 28. As a result, the IM3 products arrive at the second power splitter/combiner 50 with a mutual phase difference of 120°. As a result, the IM3 products substantially cancel each other before reaching the antenna 54.

Meanwhile, the IM3 products propagating through the second branch 32 towards the RX/TX terminal 52 pass back through the first positive phase shift network 36, thereby acquiring an extra phase shift of +120°. At the same time, the IM3 products propagating through the third branch 40 towards the RX/TX terminal 52 pass back through the second negative phase shift network 44, thereby acquiring an extra phase shift of −120°. No extra phase shift is imparted to the IM3 products propagating through the null offset branch 28. As such, the IM3 products arrive at the first power splitter/combiner 48 with a mutual 120° phase separation. Thus, the IM3 products substantially cancel before reaching the RX/TX terminal 52.

FIGS. 7A through 7C depict a modification to the RF switch 26 in which the first positive phase shift network 36 and the second positive phase shift network 46 each provide +60° of phase shift, and the first negative phase shift network 38 and the second negative phase shift network 44 each provide −60° of phase shift. As indicated by arrows in FIGS. 7B and 7C, newly generated IM3 products propagate towards the antenna 54 and towards the RX/TX terminal 52. While the IM3 products in the second branch 32 propagate towards the antenna 54, the IM3 products acquire an extra phase shift of −60° as they pass back through the first negative phase shift network 38. Similarly, while propagating towards the antenna 54, the IM3 products in the third branch 40 pass back through the second positive phase shift network 46, thereby imparting an extra phase shift of +120° to the IM3 products. No extra phase shift is imparted to the IM3 products in the null offset branch 28. As a result, the IM3 products arrive at the second power splitter/combiner 50 with a mutual phase difference of 120°. As a result, the IM3 products substantially cancel each other before reaching the antenna 54.

Meanwhile, the IM3 products propagating through the second branch 32 towards the RX/TX terminal 52 pass back through the first positive phase shift network 36, thereby acquiring an extra phase shift of +60°. At the same time, the IM3 products propagating through the third branch 40 towards the RX/TX terminal 52 pass back through the second negative phase shift network 44, thereby acquiring an extra phase shift of −60°. No extra phase shift is imparted to the IM3 products propagating through the null offset branch 28. As such, the IM3 products arrive at the first power splitter/combiner 48 with a mutual 120° phase separation. Thus, the IM3 products substantially cancel before reaching the RX/TX terminal 52.

In addition to the aforementioned advantages of the RF switch 26 in situations where a high-power signal propagates through the RX/TX terminal 52 and a high-power interferer signal arrives from the antenna 54, the RF switch 26 can also be used in instances where two simultaneous high-power signals both propagate through the RX/TX terminal 52 towards the antenna 54. Exemplary scenarios include LTE-advanced applications and other applications that require relatively high linear mode RF switches for simultaneous transmission of a plurality of TX signals that originate from a single mobile terminal (not shown). In such scenarios, the RF switch 26 does not reduce the IM3 products that reach the antenna 54. However, a problem of the receiver de-sensing due to IM3 products leaking back through the RX/TX terminal 52 to receivers (not shown) is practically eliminated.

FIGS. 8A and 8B are switch diagrams that illustrate the suppression of IM3 products resulting from high-power signals originating from a same direction. In the null offset branch 28, one-third portions of transmit signals having angular frequencies $\omega_A$ and $\omega_B$ arrive at the first switch segment 30 with a phase angle of 0°. In the second branch 32, one-third portions of transmit signals having angular frequencies $\omega_A$ and $\omega_B$ arrive at the second switch segment 34 with a phase angle of +120°. In the third branch 40, one-third portions of transmit signals having angular frequencies $\omega_A$ and $\omega_B$ arrive at the third switch segment 42 with a phase angle of −120°. The IM3 products are then generated as shown in FIG. 8B with the same relative phase shifts of 0°, +120°, and −120°. From that point, the IM3 products propagate outward towards the antenna 54 and back towards the RX/TX terminal 52. The IM3 products traveling toward the antenna 54 are shifted by 0°, −120°, and +120°, respectively, thereby shifting the IM3 products back to the same phase. Thus, the IM3 products add constructively at the second power splitter/combiner 50 before propagating on to the antenna 54. However, the IM3 products propagating towards the RX/TX terminal 52 are phase-shifted by an additional by 0°, +120°, and −120°, respectively. As a result, the IM3 products acquire a total relative phase shift of 0°, +240°, and −240°, respectively. Since the IM3 products have substantially the same amplitudes and the aforementioned phases, the IM3 products add vectorially to zero as the IM3 products are recombined in the first power splitter/combiner 48. Therefore, the IM3 products are practically eliminated before reaching the TX/RX terminal 52. The IM3 products can also be practically eliminated by implementing the modification to the RF switch 26 in which the first positive phase shift network 36 and the second positive phase shift network 46 each provide +60° of phase shift, and the first negative phase shift network 38 and the second negative phase shift network 44 each provide −60° of phase shift.

The above analyses assume that ideal power splitters/combiners are used so that power is automatically delivered equally among all three circuit branches, regardless of any imbalance in the load impedance among them. When using power splitters exhibiting this ideal behavior, the circuit could encompass nearly any nonlinear elements, including filters and duplexers. In the more likely real-world implementation in a cellular handset, however, the first power splitter/combiner 48 and the second splitter/combiner 50 could be facilitated with transformers or simple electrical tees. In this non-ideal case, power is divided in inverse proportion to the real part of the reflection coefficient of each path as seen from the frame of reference of the first splitter/combiner 48 and the second splitter/combiner 50. For a mismatched load, the non-zero reflection coefficients are rotated by the three phase shifters to three triametrically opposed values. In such a situation it can be difficult for all three reflection coefficients to simultaneously have the same real part. Therefore, the present disclosure is more easily adaptable for components such as RF switches which present a well-matched impedance at both the transmitter frequency and the interferer frequency. Components such as bandpass filters and duplexers are more directly applicable when both the transmit signal and interferer signal fall in-band.

FIG. 9 depicts a generalized embodiment of the RF switch 26. The generalized embodiment of the RF switch 26 includes a plurality of branches 56. Each of the plurality of branches 56 has a positive phase shift network 58 and a negative phase shift network 60 and a switch segment 62. The switch segment 62 is made up of field effect transistors (FETs) that include a control terminal $V_{GATE}$ for turning the RF switch 26 on and off. The switch segment 62 is coupled between the positive phase shift network 58 and the negative phase shift network 60. A null offset branch 64 with a switch segment 66 is coupled in parallel with the plurality of branches 56. The switch segment 66 is made up of FETs that also includes the control terminal $V_{GATE}$ for turning the RF switch 26 on and off. The switch segments 62 and 66 include gate resistors $R_G$, a common gate resistor $R_C$, source-drain resistors $R_{SD}$, and body resistors $R_B$. A body voltage for the switch segments 62 and 66 are controlled by a body terminal $V_{BODY}$ that is coupled to a common body resistor $R_{BC}$.

Phase offsets represented as $+\Theta_{M-1}$ and $-\Theta_{M-1}$ in FIG. 9 have a same magnitude but different polarities, while in one embodiment phase offsets represented as $+\Theta_{M-1}$ and $+\Theta_M$, and phase offsets represented as $-\Theta_{M-1}$ and $-\Theta_M$ of different ones of the plurality of branches 56 have different magnitudes. The phase offsets represented as $+\Theta_{M-1}$ and $+\Theta_M$, and phase offsets represented as $-\Theta_{M-1}$ and $-\Theta_M$ can be selected to cause IM3 products generated by and propagating through the RF switch 26 in one direction through the RF switch 26 to substantially cancel. In this case the phase offsets are equal to M·(90°)/N, where N is a total number of the plurality of branches 56 including the null offset branch 64, and where M is an integer such that M<2·N.

Alternately, the phase offsets represented as $+\Theta_{M-1}$ and $+\Theta_M$, and phase offsets represented as $-\Theta_{M-1}$ and $-\Theta_M$ can be selected to cause IM3 products generated by and propagating through the RF switch 26 in one direction through the RF switch 26 to substantially cancel. In this case the phase offsets are equal to M·(180°)/N, where N is a total number of the plurality of branches 56 including the null offset branch 64, and where M is an integer such that M<N, and M does not equal N/2. However, it should be noted that in special cases, different ones of the plurality of branches 56 can have phase offsets that have a same magnitude. FIG. 4 is an example in which phase offsets of different ones of the plurality of branches 56 (FIG. 9) can have the same magnitude. In the case of FIG. 4, the phase offset magnitudes are all equal to 120°.

FIG. 10A is a schematic diagram for a simulator configuration 68 that is usable to simulate the related art RF switch 10 depicted in FIG. 2. The simulation begins with a TX signal generator 70 that generates a TX signal having a frequency of 786 MHz and a power 0 dBm. The TX signal propagates through the related art RF switch 10 (FIG. 2), which is modeled by a linear model of Silicon-on-insulator (SOI) switch 72 and a shunt third-order nonlinear element 74. The shunt third-order nonlinear element 74 generates simulated IM3 products in order to represent nonlinear behavior of the related art RF switch 10. The simulator configuration 68 also includes an antenna VSWR tuning block 76 having a VSWR phase shift function 78, and a first ideal transformer 80. The antenna VSWR tuning block 76 is coupled between the related art RF switch 10 and a second ideal transformer 82 that in turn is coupled through a current probe 84 to a first resistor 86 that simulates an antenna. An interferer signal generator 88 is communicatively coupled through a second resistor 90 to a tap point 92 between the current probe 84 and the second ideal transformer 82. The interferer signal generator 88 generates an interferer signal at 836 MHz with a relatively high-power of about 0 dBm at the tap point 92. The antenna VSWR tuning block 76 with the VSWR phase shift function 78 combined with the first ideal transformer 80 and the second ideal transformer 82 provide a user-selectable non-ideal antenna VSWR.

The RF switch 26 of the present disclosure is simulated using a simulator configuration 94 depicted in a schematic diagram of FIG. 10B. The simulator configuration 94 is a modified embodiment of the simulator configuration 68 (FIG. 10A). The simulator configuration 94 replaces the related art RF switch 10 (FIG. 10A) with the first switch segment 30 (FIG. 4), the second switch segment 34 (FIG. 4), and the third switch segment 42 (FIG. 4), which are each modeled by a linear model of Silicon-on-insulator (SOI) switch segment 96 and the shunt third-order nonlinear element 74 (FIG. 4). The first positive phase shift network 36 (FIG. 4), and the second positive phase shift network 46 (FIG. 4) are inductor-capacitor (LC) tee networks that each comprise series inductors L1 and L2 and a shunt capacitor C1. The first negative phase shift network 38 (FIG. 4), and the second negative phase shift network 44 (FIG. 5A) are inductor-capacitor (LC) tee networks that each comprise series capacitors C2 and C3 and a shunt inductor L3. A power division of the TX signal is achieved using a trio of transformers 98 having primary coils in series and secondary coils in parallel. The trio of transformers 98 models a single 4-port transformer (not shown) with one primary coil and three secondary coils. A third ideal transformer 100 couples the RF switch 26 to the antenna VSWR tuning block 76.

During a simulation, divided portions of the TX signal propagate through the null offset branch 28 (FIG. 4), the second branch 32 (FIG. 4), and the third branch 40 (FIG. 4). The null offset branch 28 does not add a phase shift to the inherent phase $\Phi_1$ or the inherent phase $\Phi_2$. However, the first positive phase shift network 36 adds a positive offset of +120° to the TX signal portion propagating through the second branch 32 before the TX signal portion arrives at the second switch segment 34. Moreover, the second negative phase shift network 44 adds a negative offset of −120° to the TX signal portion propagating through the third branch 40 before the TX signal portion arrives at the third switch segment 42. The TX signal portion propagating through the second branch 32 is phase shifted −120° by the first negative phase shift network 38 after passing through the switch segment 34. Simultaneously, the TX signal portion propagating through the third branch 40 passes through the third switch segment 42 and through the second positive phase shift network 46 that adds a +120° phase shift to the TX signal portion. The TX signal portion propagating through the null offset branch 28 continues through the first switch segment 30 and into the third ideal transformer 100, where the TX signal portion is recombined with the TX signal portions propagating through the second branch 32 and the third branch 40.

For purposes of this simulation, the trio of transformers 98 have turns ratios of 1:√3 These particular turns ratio were used so that an existing 50Ω RF switch design (not shown) could be used for the simulation. These turns ratios effectively triple a 50Ω impedance of each of the null offset branch 28, the second branch 32, and the third branch 40 to 150Ω. In this way, a parallel impedance of a parallel combination of the null offset branch 28, the second branch 32, and the third branch 40 reduces to a required 50Ω. The third ideal transformer 100 has a turns ratio of 1:√3. In a real-world implementation of the RF switch 26, the null offset branch 28, the second branch 32, and the third branch 40 can be designed to provide 150Ω impedances inherently. In such a case, impedance transformations would be unnecessary and the trio of transformers 98 would have 1:1 turns ratios, and the third ideal transformer 100 would be eliminated.

The simulation results are shown in FIGS. 11A through 11D. These spectral plots clearly show the input TX signal at 786 MHz and the interferer signal at 836 MHz, both at around 0 dBm, as well as the resultant $IM3_{down}$ and $IM3_{up}$ products at 736 MHz and 886 MHz respectively. In the first two plots shown in FIG. 11A and FIG. 11B, the results are shown for the related art RF switch 10 (FIGS. 2 and 10A), with an ideal 1:1 antenna VSWR and a worst-case 3:1 VSWR, respectively. The worst-case 3:1 VSWR is determined by first mismatching the antenna impedance by a 3:1 ratio, then varying the VSWR phase through a full 360° via the antenna VSWR tuning block 76 (FIG. 10A) until a worst-case is found. The simulation shows that the related art RF switch 10 results in $IM3_{down}$ and $IM3_{up}$ generation at levels of −49.7 dBm each with an ideal antenna. With a 3:1 mismatch the $IM3_{down}$ level increases to −44.5 dBm and the $IM3_{up}$ to −49.1 dBm. The reason for the asymmetric impact is that the interferer signal is partially blocked from reaching the nonlinear switches by the VSWR mismatch, while the desired signal is still delivered as before. This can be compared to FIGS. 11C and 11D which show the same results for the newly invented circuit. By employing the RF switch 26 (FIG. 5A), the $IM3_{down}$ power is reduced to −85.5 dBm under ideal conditions and −63.3 dBm when mismatched. Meanwhile, the $IM3_{up}$ power is reduced to −80.6 dBm under ideal conditions and −78.8 dBm when mismatched. Thus, the RF switch 26 improves $IM3_{down}$ suppression by approximately 36 dB under matched conditions and 19 dB under mismatched conditions, while improving $IM3_{up}$ suppression by approximately 30 dB under both matched and mismatched conditions. This improvement in IM3 reduction is sufficient to allow SV-LTE using existing switch technology. It should also be noted that while the RF switch 26 may use up to three times the number of non-linear components such as switch segments, each of the non-linear components operates at a third of the power and three times the impedance of a related art switch such as the RF switch 10 (FIG. 2). As a result, the RF switch 26 of the present disclosure is neither significantly larger nor significantly more expensive than the related art RF switch 10.

Turning now to FIG. 12, the RF switch 26 is incorporated in a mobile terminal 102, such as a cellular handset, a personal digital assistant (PDA), or the like. The basic architecture of the mobile terminal 102 may include a receiver front end 104, an RF transmitter section 106, an antenna 108, a baseband processor 110, a control system 112, a frequency synthesizer 114, and an interface 116. The receiver front end 104 receives information bearing RF signals from one or more remote transmitters provided by a base station. A low noise amplifier 118 amplifies the signal. A filter circuit 120 minimizes broadband interference in the received signal, while downconversion and digitization circuitry 122 downconverts the filtered, received signal to an intermediate or baseband frequency signal, which is then digitized into one or more digital streams. The receiver front end 104 typically uses one or more mixing frequencies generated by the frequency synthesizer 114.

The baseband processor 110 processes the digitized received signal to extract the information or data bits conveyed in the received signal. This processing typically comprises demodulation, decoding, and error correction operations. As such, the baseband processor 110 is generally implemented in one or more digital signal processors (DSPs).

On the transmit side, the baseband processor 110 receives digitized data, which may represent voice, data, or control information, from the control system 112, which it encodes for transmission. The encoded data is output to the RF transmitter section 106, where it is used by a modulator 124 to modulate a carrier signal that is at a desired transmit frequency. Power amplifier (PA) circuitry 126 amplifies the modulated carrier signal to a level appropriate for transmission from the antenna 108. The control system 112 generates an RF SWITCH CONTROL signal that is usable to turn the RF switch 26 on and off.

A user may interact with the mobile terminal 102 via the interface 116, which may include interface circuitry 128 associated with a microphone 130, a speaker 132, a keypad 134, and a display 136. The interface circuitry 128 typically includes analog-to-digital converters, digital-to-analog converters, amplifiers, and the like. Additionally, it may include a voice encoder/decoder, in which case it may communicate directly with the baseband processor 110.

The microphone 130 will typically convert audio input, such as the user's voice, into an electrical signal, which is then digitized and passed directly or indirectly to the baseband processor 110. Audio information encoded in the received signal is recovered by the baseband processor 110 and converted into an analog signal suitable for driving the speaker 132 by the interface circuitry 128. The keypad 134 and the display 136 enable the user to interact with the mobile terminal 102, inputting numbers to be dialed, address book information, or the like, as well as monitoring call progress information.

Those skilled in the art will recognize improvements and modifications to the preferred embodiments of the present disclosure. All such improvements and modifications are considered within the scope of the concepts disclosed herein and the claims that follow.

What is claimed is:

1. An RF switch for suppressing third-order intermodulation (IM3) products generated in the RF switch, the RF switch comprising:
   a plurality of branches coupled in parallel, each of the plurality of branches including a positive phase shift network, a negative phase shift network and a switch segment, wherein the switch segment is coupled between the positive phase shift network and the negative phase shift network;
   a null offset branch with a switch segment coupled in parallel with the plurality of branches; and
   a control terminal for turning the switch segment of the null offset branch on and off, and for turning the switch segment of each of the plurality of branches on and off.

2. The RF switch of claim 1 wherein phase offsets provided by the positive phase shift network and the negative phase shift network of each of the plurality of branches have the same magnitude but opposite polarities, while phase offsets provided by the positive phase shift network and the negative phase shift network of different ones of the plurality of branches have different magnitudes.

3. The RF switch of claim 2 wherein the different magnitudes of the phase offsets are selected to cause IM3 products generated by and propagating through the RF switch in one direction to substantially cancel.

4. The RF switch of claim 3 wherein the different magnitudes of the phase offsets are equal to M·(90°)/N, where N is a total number of the plurality of branches including the null offset branch, and where M is an integer such that M<2·N.

5. The RF switch of claim 2 wherein the different magnitudes of the phase offsets are selected to cause IM3 products generated by and propagating through the RF switch in opposite directions to substantially cancel.

6. The RF switch of claim 5 wherein the different magnitudes of the phase offsets are equal to M·(180°)/N, where N is a total number of the plurality of branches including the null offset branch, and where M is an integer such that M<N and M does not equal N/2.

7. The RF switch of claim 1 wherein the plurality of branches and the null offset branch are adapted to be coupled between a first power splitter/combiner and a second power splitter/combiner.

8. The RF switch of claim 1 wherein the positive phase shift network and the negative phase shift network each comprise an inductor-capacitor (LC) tee network.

9. The RF switch of claim 8 wherein the LC tee network comprising the positive phase shift network comprises series inductors and a shunt capacitor.

10. The RF switch of claim 8 wherein the LC tee network comprising the negative phase shift network comprises series capacitors and a shunt inductor.

11. The RF switch of claim 1 wherein the switch segment of the null offset branch and each switch segment of the plurality of branches comprises series stacked field effect transistors.

12. A mobile terminal comprising:
an antenna;
a receiver front end;
an RF switch coupled between the antenna and the receiver front end, the RF switch comprising:
a plurality of branches coupled in parallel, each of the plurality of branches including a positive phase shift network, a negative phase shift network and a switch segment, wherein the switch segment is coupled between the positive phase shift network and the negative phase shift network;
a null offset branch with a switch segment coupled in parallel with the plurality of branches; and
a control terminal coupled to the switch segment of the null offset branch and the switch segment of each of the plurality of branches; and
a control system that is communicatively coupled to the control terminal to provide an RF Switch control signal for turning the switch segment of the null offset branch on and off, and for turning the switch segment of each of the plurality of branches on and off.

13. The mobile terminal of claim 12 wherein phase offsets provided by the positive phase shift network and the negative phase shift network of each of the plurality of branches have the same magnitude but opposite polarities, while phase offsets provided by the positive phase shift network and the negative phase shift network of different ones of the plurality of branches have different magnitudes.

14. The mobile terminal of claim 13 wherein the different magnitudes of the phase offsets are selected to cause IM3 products generated by and propagating through the RF switch in one direction to substantially cancel.

15. The mobile terminal of claim 14 wherein the different magnitudes of the phase offsets are equal to M·(90°)/N, where N is a total number of the plurality of branches including the null offset branch, and where M is an integer such that M<2·N.

16. The mobile terminal of claim 13 wherein the different magnitudes of the phase offsets are selected to cause IM3 products generated by and propagating through the RF switch in opposite directions to substantially cancel.

17. The mobile terminal of claim 16 wherein the different magnitudes of the phase offsets are equal to M·(180°)/N, where N is a total number of the plurality of branches including the null offset branch, and where M is an integer such that M<N and M does not equal N/2.

18. The mobile terminal of claim 12 wherein the plurality of branches and the null offset branch are adapted to be coupled between a first power splitter/combiner and a second power splitter/combiner.

19. The mobile terminal of claim 12 wherein the positive phase shift network and the negative phase shift network each comprise an inductor-capacitor (LC) tee network.

20. The mobile terminal of claim 19 wherein the LC tee network comprising the positive phase shift network comprises series capacitors and a shunt inductor.

21. The mobile terminal of claim 19 wherein the LC tee network comprising the negative phase shift network comprises series inductors and a shunt capacitor.

22. The mobile terminal of claim 12 wherein the switch segment of the null offset branch and each switch segment of the plurality of branches comprises series stacked field effect transistors.

23. An RF system for suppressing third-order intermodulation (IM3) products generated in nonlinear components, the RF system comprising:
a plurality of branches coupled in parallel, each of the plurality of branches including a positive phase shift network, a negative phase shift network and nonlinear components, wherein the nonlinear components are coupled between the positive phase shift network and the negative phase shift network; and
a null offset branch with nonlinear components coupled in parallel with the plurality of branches.

24. The RF system of claim 23 wherein phase offsets provided by the positive phase shift network and the negative phase shift network of each of the plurality of branches have the same magnitude but opposite polarities, while phase offsets provided by the positive phase shift network and the negative phase shift network of different ones of the plurality of branches have different magnitudes.

25. The RF system of claim 23 wherein the different magnitudes of the phase offsets are selected to cause IM3 products generated by and propagating through the RF system in one direction to substantially cancel.

26. The RF system of claim 25 wherein the different magnitudes of the phase offsets are equal to M·(90°)/N, where N is a total number of the plurality of branches including the null offset branch, and where M is an integer such that M<2·N.

27. The RF system of claim 24 wherein the different magnitudes of the phase offsets are selected to cause IM3 products generated by and propagating through the RF system in opposite directions to substantially cancel.

28. The RF system of claim 27 wherein the different magnitudes of the phase offsets are equal to M·(180°)/N, where N is a total number of the plurality of branches including the null offset branch, and where M is an integer such that M<N and M does not equal N/2.

29. The RF system of claim 23 wherein the plurality of branches and the null offset branch are adapted to be coupled between a first power splitter/combiner and a second power splitter/combiner.

30. The RF system of claim 23 wherein the positive phase shift network and the negative phase shift network each comprise an inductor-capacitor (LC) tee network.

31. The RF system of claim 30 wherein the LC tee network comprising the positive phase shift network comprises series inductors and a shunt capacitor.

32. The RF system of claim 30 wherein the LC tee network comprising the negative phase shift network comprises series capacitors and a shunt inductor.

33. The RF system of claim 23 wherein the nonlinear components of the null offset branch and each of the nonlinear components of the plurality of branches comprises series stacked field effect transistors.

* * * * *